US012767596B2

(12) United States Patent
Purola et al.

(10) Patent No.: US 12,767,596 B2
(45) Date of Patent: Oct. 20, 2026

(54) METHOD AND APPARATUS FOR MANUFACTURING STEEL USING ROTARY GENERATED THERMAL ENERGY

(71) Applicant: Coolbrook Oy, Helsinki (FI)

(72) Inventors: Veli Matti Purola, Helsinki (FI); Tuomas Ouni, Helsinki (FI)

(73) Assignee: COOLBROOK OY, Helsinki (FI)

( * ) Notice: Subject to any disclaimer, the term of this patent is extended or adjusted under 35 U.S.C. 154(b) by 694 days.

(21) Appl. No.: 18/046,321

(22) Filed: Oct. 13, 2022

(65) Prior Publication Data

US 2023/0121974 A1 Apr. 20, 2023

Related U.S. Application Data

(60) Provisional application No. 63/255,433, filed on Oct. 13, 2021.

(51) Int. Cl.
*C04B 7/43* (2006.01)
*B28B 11/24* (2006.01)
(Continued)

(52) U.S. Cl.
CPC ............ *C04B 7/432* (2013.01); *B28B 11/243* (2013.01); *C01B 3/24* (2013.01); *C01B 32/16* (2017.08);
(Continued)

(58) Field of Classification Search
CPC ........... C04B 7/432; C04B 7/367; C04B 7/42; C04B 7/475; C04B 33/24; C04B 33/32;
(Continued)

(56) References Cited

U.S. PATENT DOCUMENTS 4,614,229 A 9/1986 Oldweiler
2006/0116543 A1 6/2006 Bellet et al.
(Continued)

FOREIGN PATENT DOCUMENTS

CN 110923394 A 3/2020
EP 1063273 A1 12/2000
(Continued)

OTHER PUBLICATIONS

Bailera et al. "A Review on CO2 mitigation in the Iron and Steel industry Power to X processes," Journal of CO2 Utilization 26, Feb. 16, 2021 (Year: 2021).*
(Continued)

*Primary Examiner* — Danielle M. Carda
(74) *Attorney, Agent, or Firm* — Eversheds Sutherland (US) LLP

(57) ABSTRACT

Methods for inputting thermal energy into fluidic medium in a steel manufacturing process include generation of a heated fluidic medium by at least one rotary apparatus having a rotor with at least one row of rotor blades and a stator configured as an assembly of stationary vanes arranged at least upstream of the at least one row of rotor blades. An amount of thermal energy is imparted to a stream of fluidic medium by virtue of a series of energy transformations occurring when the stream of fluidic medium passes through the stationary vanes and the at least one row of rotor blades, respectively. The method further includes integration of the at least one rotary apparatus into a steel production facility configured to carry out steel production processes, and conducting an amount of input energy into the at least one rotary apparatus integrated into the heat-consuming process facility.

34 Claims, 12 Drawing Sheets

(51) Int. Cl.

| | |
|---|---|
| ***C01B 3/24*** | (2006.01) |
| ***C01B 32/16*** | (2017.01) |
| ***C03B 5/235*** | (2006.01) |
| ***C03B 37/022*** | (2006.01) |
| ***C03C 1/00*** | (2006.01) |
| ***C04B 7/36*** | (2006.01) |
| ***C04B 7/42*** | (2006.01) |
| ***C04B 7/47*** | (2006.01) |
| ***C04B 33/24*** | (2006.01) |
| ***C04B 33/32*** | (2006.01) |
| ***C10G 9/40*** | (2006.01) |
| ***C10G 11/20*** | (2006.01) |
| ***C10G 47/32*** | (2006.01) |
| ***C10G 47/36*** | (2006.01) |
| ***C21B 13/08*** | (2006.01) |
| ***D01F 9/22*** | (2006.01) |
| ***F22B 3/06*** | (2006.01) |
| ***F23G 7/06*** | (2006.01) |
| ***F24H 1/00*** | (2022.01) |
| ***F24V 30/00*** | (2018.01) |
| ***F24V 40/00*** | (2018.01) |
| ***F27B 7/20*** | (2006.01) |
| ***F27B 7/34*** | (2006.01) |
| ***F27B 9/10*** | (2006.01) |
| ***F28D 20/00*** | (2006.01) |

(52) U.S. Cl.

CPC ............ *C03B 5/235* (2013.01); *C03B 37/022* (2013.01); *C03C 1/004* (2013.01); *C04B 7/367* (2013.01); *C04B 7/42* (2013.01); *C04B 7/475* (2013.01); *C04B 33/24* (2013.01); *C04B 33/32* (2013.01); *C10G 9/40* (2013.01); *C10G 11/20* (2013.01); *C10G 47/32* (2013.01); *C10G 47/36* (2013.01); *C21B 13/085* (2013.01); *D01F 9/22* (2013.01); *F22B 3/06* (2013.01); *F23G 7/061* (2013.01); *F24H 1/0018* (2013.01); *F24V 30/00* (2018.05); *F24V 40/00* (2018.05); *F27B 7/2016* (2013.01); *F27B 7/34* (2013.01); *F27B 9/10* (2013.01); *F28D 20/0056* (2013.01); *C01B 2203/0205* (2013.01); *C01B 2203/0833* (2013.01); *C01B 2203/1241* (2013.01); *C04B 2290/20* (2013.01); *C10G 2300/1033* (2013.01); *C10G 2300/4081* (2013.01); *C10G 2300/807* (2013.01); *F23G 2204/00* (2013.01); *F23G 2209/14* (2013.01); *F28D 2020/0013* (2013.01); *F28D 2020/0026* (2013.01); *F28D 2020/0047* (2013.01); *F28D 2020/006* (2013.01); *F28D 2020/0078* (2013.01)

(58) Field of Classification Search

CPC ......... C04B 2290/20; C04B 7/46; C04B 7/44; B28B 11/243; C01B 3/24; C01B 32/16; C01B 2203/0205; C01B 2203/0833; C01B 2203/1241; C01B 2203/0233; C01B 2203/0822; C01B 3/38; C03B 5/235; C03B 37/022; C03B 1/004; C10G 9/40; C10G 11/20; C10G 47/32; C10G 47/36; C10G 2300/1033; C10G 2300/4081; C10G 2300/807; C10G 9/20; C10G 9/24; C21B 13/085; D01F 9/22; F22B 3/06; F23G 7/061; F23G 2204/00; F23G 2209/14; F24H 1/0018; F24V 30/00; F24V 40/00; F27B 7/2016; F27B 7/34; F27B 9/10; F27B 2007/365; F27B 2007/367; F27B 7/36; F27B 7/362; F28D 20/0056; F28D 2020/0013; F28D 2020/0026; F28D 2020/0047; F28D 2020/006; F28D 2020/0078; Y02E 20/12; Y02P 40/121; C03C 1/004

USPC ............................................................ 75/458

See application file for complete search history.

(56) References Cited

U.S. PATENT DOCUMENTS

| | | | | |
|---|---|---|---|---|
| 2007/0007175 | A1 | 1/2007 | Strack et al. | |
| 2008/0128326 | A1 | 6/2008 | McCoy et al. | |
| 2012/0024749 | A1 | 2/2012 | Strack et al. | |
| 2013/0280035 | A1 | 10/2013 | Hummer | |
| 2014/0243569 | A1 * | 8/2014 | Seppala | B01J 3/08 585/653 |
| 2019/0284485 | A1 | 9/2019 | Willigenburg | |
| 2020/0114332 | A1 * | 4/2020 | Xu | C10G 9/00 |
| 2020/0290939 | A1 | 9/2020 | Willigenburg | |
| 2021/0171836 | A1 | 6/2021 | Purola | |

FOREIGN PATENT DOCUMENTS

| | | | |
|---|---|---|---|
| EP | 3249027 | A1 | 11/2017 |
| EP | 3415587 | A1 | 12/2018 |
| EP | 3725865 | A1 | 10/2020 |
| JP | S58-213087 | A | 12/1983 |
| JP | 2003504485 | A | 2/2003 |
| WO | 2017125833 | A1 | 7/2017 |

OTHER PUBLICATIONS

Extended European Search Report, EP 22880469.6, dated Aug. 5, 2025 (9 pp.).

Martínez I et al.: "Integration of a fluidised bed Ca—Cu chemical looping process in a steel mill", Energy, Elsevier, Amsterdam, NL, vol. 163, Aug. 28, 2018 (Aug. 28, 2018), pp. 570-584, XP085503150, ISSN: 0360-5442, DOI: 10.1016/J.ENERGY.2018.08.123 (15 pp.).

Cormos Calin-Cristian Ed—Coronas Alberto et al.: "Evaluation of reactive absorption and adsorption systems for post-combustion CO2 capture applied to iron and steel industry", Applied Thermal Engineering, Pergamon, Oxford, GB, vol. 105, May 25, 2016 (May 25, 2016), pp. 56-64, XP029643854, ISSN: 1359-4311, DOI: 10.1016/J.APPLTHERMALENG.2016.05.149 (9 pp.).

Bailera Manuel et al.: "A review on CO2 mitigation in the Iron and Steel industry through Power to X processes", Journal of CO2 Utilization, vol. 46, Apr. 1, 2021 (Apr. 1, 2021), p. 101456, XP055932893, NL ISSN: 2212-9820, DOI: 10.1016/j.jcou.2021.101456 (30 pp.).

International Search Report and Written Opinion, PCT/FI2022/050685, dated Dec. 23, 2022 (16 pp.).

* cited by examiner

3000

4000

METHOD AND APPARATUS FOR MANUFACTURING STEEL USING ROTARY GENERATED THERMAL ENERGY

CROSS-REFERENCE TO RELATED APPLICATION

This application claims priority to U.S. Provisional Patent Application No. 63/255,433, filed Oct. 13, 2021, which is incorporated herein by reference.

FIELD OF THE INVENTION

The present invention generally relates to systems and methods for inputting thermal energy (heat) into fluids. In particular, the invention relates to tools and processes for optimizing energy efficiency and reducing greenhouse gas and particle emissions in heat-consuming industrial processes related to steel production carried out at high and extremely high temperatures.

BACKGROUND

Industry and governments have been combating to find technologies to achieve significant reductions in greenhouse gas (GHG) emission reduction. Heavy industrial processes such as steel production, have a key role to reach low emission targets set by companies, governments and international organizations. Electrification of these processes has been seen as a solution to reduce emissions. One of the obstacles for electrification was achieving high temperatures needed in steel production. By way of example, the core processes to melt and form steel require very high temperatures, such as within a range of about 850 to 1600 degrees Celsius (° C.). This sets strict requirements for energy sources and utilized technologies. In particular, while electricity already is used for some high temperature processes (such as in electric arc furnaces to melt steel, for example), in most cases, neither the technologies nor the economics are yet in place to do so.

A number of rotary solutions have been proposed for heating purposes. Thus, U.S. Pat. No. 11,098,725 B2 (Sanger et al) discloses a hydrodynamic heater pump device operable to selectively generate a stream of heated fluid and/or pressurized fluid. A mentioned hydrodynamic heater pump is designed to be incorporated in an automotive vehicle cooling system to provide heat for warming a passenger compartment of the vehicle and to provide other capabilities, such as window deicing and engine cooling. The disclosed device may also provide a stream of pressurized fluid for cooling an engine. Disclosed technology is based on friction; and, since the fluid to be heated is liquid, the presented design is not suitable for conditions involving extreme turbulence of gas aerodynamics.

U.S. Pat. No. 7,614,367 B1 (Frick) discloses a system and method for flamelessly heating, concentrating or evaporating a fluid by converting rotary kinetic energy into heat. Configured for fluid heating, the system may comprise a rotary kinetic energy generator, a rotary heating device, and a primary heat exchanger, all in closed-loop fluid communication. The rotary heating device may be a water brake dynamometer. The document discloses the use of the system for heating water in offshore drilling or production platforms. However, the presented system is not suitable for heating gaseous media, neither is it feasible for use with high and extremely high temperatures (due to liquid stability, vapor pressure, etc.).

Additionally, some rotary turbomachine-type devices are known to implement the processes of hydrocarbon (steam) cracking and aim at maximizing the yields of the target products, such as ethylene and propylene.

In this regard, an update in the field of technology related to design and manufacturing of efficient heating systems, in particular those suitable for high and extremely high temperature related applications, is still desired, in view of addressing challenges associated with raising temperatures of fluidic substances in efficient and environmentally friendly manner.

SUMMARY OF THE INVENTION

An objective of the present invention is to solve or to at least mitigate at least some of the problems arising from the limitations and disadvantages of the related art. One or more objectives are achieved by various embodiments of the methods for generation of a heated fluidic medium described herein, the rotary apparatuses and related uses as defined herein.

In an aspect, a method for steel production comprises generation of a heated fluidic medium by at least one rotary apparatus integrated into a steel production facility.

According to an embodiment, the method for steel production, which comprises generation of a heated fluidic medium by at least one rotary apparatus integrated into the steel production facility, improves energy efficiency or reduces greenhouse gas and particle emissions, or both.

In embodiments, the method for steel production comprises generation of a heated fluidic medium by virtue of at least one rotary apparatus integrated into a steel production facility, the at least one rotary apparatus comprising: a casing with at least one inlet and at least one exit, a rotor comprising at least one row of rotor blades arranged over a circumference of a rotor hub mounted onto a rotor shaft, and a plurality of stationary vanes arranged into an assembly at least upstream of the at least one row of rotor blades, wherein an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated; the method further comprises: conducting an amount of input energy into the at least one rotary apparatus integrated into the heat-consuming process facility, the input energy comprises electrical energy, supplying the stream of heated fluidic medium generated by the at least one rotary apparatus into the steel production facility, and operating said at least one rotary apparatus and said steel production facility to carry out steel production at temperatures essentially equal to or exceeding about 500 degrees Celsius (° C.).

In another aspect, a method is provided for inputting thermal energy into fluidic medium during steel production.

In an embodiment, the method comprises inputting thermal energy into a process or processes related to producing steel in a steel production facility, the method comprises generation of a heated fluidic medium by at least one rotary apparatus integrated into a steel production facility, the at least one rotary apparatus comprising a casing with at least one inlet and at least one exit, a rotor comprising at least one row of rotor blades arranged over a circumference of a rotor hub mounted onto a rotor shaft, and a plurality of stationary vanes arranged into an assembly at least upstream of the at least one row of rotor blades, the method further comprises:

integrating the at least one rotary apparatus into the steel production facility configured to carry out process or processes related to production of steel at temperatures essentially equal to or exceeding about 500 degrees Celsius (° C.); conducting an amount of input energy into the at least one rotary apparatus integrated into the steel production facility, the input energy comprising electrical energy, and operating the at least one rotary apparatus integrated into the steel production facility such, that an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated.

In embodiments, the method comprises operating the at least one rotary apparatus operatively connected to at least one furnace within the steel production facility. In an embodiment, the at least one furnace is configured for steel making. In an embodiment, the furnace is configured to react steel pre-cursor materials and to form steel in the steel production facility. In embodiments, the method comprises operating the at least one rotary apparatus operatively connected to at least one furnace configured as a blast furnace for reducing iron ore to iron whereby molten iron is produced. Reduction of iron ore in the blast furnace may employ coke as reducing agent.

In some configurations, the at least one rotary apparatus can be operatively connected to at least one furnace configured as a basic oxygen furnace for oxygenating molten iron, whereby low-carbon steel is produced. In embodiments, the method comprises operating the at least one rotary apparatus operatively connected to at least one process unit configured as a furnace, a kiln or a reactor for direct reduction of iron ore to produce directly reduced iron (DRI), also referred to as "sponge iron". During DRI production, iron ore is reduced to iron without melting it. Gas-based DRI processes take place in a process unit configured as a furnace, a kiln or a fluidized bed type reactor, in which the iron ore is reacted with hot reducing gas, such as hydrogen, natural gas or coke gas. Coke gas is a by-product of a coke-making process, also referred to as a coke plant off-gas or coke oven gas (COG). DRI processes may be followed with an appropriate melting procedure (e.g. electric art melting) to produce steel.

In embodiments, the method comprises operating the at least one rotary apparatus operatively connected to at least one sintering plant and/or a pellet plant configured to sinter iron ore into iron ore sinter and/or pellets. In embodiments, the method comprises operating the at least one rotary apparatus operatively connected to at least one furnace or a coke plant configured for coking coal into coke in the steel production facility. In embodiments, the method comprises operating the at least one rotary apparatus operatively connected to at least one post-processing unit configured for post-processing of a steel product via any one of: heat treatment, carburizing, casting and/or rolling. In embodiments, the method comprises operating the at least one rotary apparatus operatively connected to at least one reactor or a series of reactors configured for the endothermic reactions in steel production, in particular, for the endothermic reactions of off-gases generated in steel production. Any combination of the embodiments described above can be conceived.

As used herein, a "furnace" refers to an apparatus in which heat is produced or added as part of a combustion process. The furnace may be a blast furnace, a cupola furnace, a pot and tank furnace, a shaft furnace, a regenerative furnace, or another furnace depending on the needs of the specific application. The decision to recite "furnace" to the exclusion of any specific type of furnace or another apparatus for combustion is in the interest of brevity only and is not intended to limit the scope of the invention.

In embodiment, the method comprises generation of the fluidic medium heated to the temperature essentially equal to or exceeding about 500 degrees Celsius (° C.), or to the temperature essentially equal to or exceeding about 1200° C., or to the temperature essentially equal to or exceeding about 1700° C.

In embodiment, the method comprises adjusting velocity and/or pressure of the stream of fluidic medium propagating through the rotary apparatus, to produce conditions, at which the stream of the heated fluidic medium is generated.

In embodiments, in said method, the heated fluidic medium is generated by at least one rotary apparatus comprising two or more rows of rotor blades sequentially arranged along the rotor shaft.

In an embodiment, in said method, the heated fluidic medium is generated by at least one rotary apparatus further comprising a diffuser area arranged downstream of the at least one row of rotor blades, the method furthers comprises operating the at least one rotary apparatus integrated into the steel production facility such, that an amount of thermal energy is imparted to a stream of fluidic medium directed along a flow path formed inside the casing between the inlet and the exit by virtue of a series of energy transformations occurring when said stream of fluidic medium successively passes through the stationary guide vanes, the at least one row of rotor blades and the diffuser area, respectively, whereby a stream of heated fluidic medium is generated. The diffuser area may be configured with or without stationary vanes.

In embodiments, in said method, the amount of thermal energy added to the stream of fluidic medium propagating through the rotary apparatus is controlled by adjusting the amount of input energy conducted into the at least one rotary apparatus integrated into the steel production facility.

In embodiments, the method further comprises arranging an additional heating apparatus downstream of the at least one rotary apparatus and introducing a reactive compound or a mixture of reactive compounds to the stream of fluidic medium propagating through the rotary apparatus and/or through said additional heating apparatus, whereupon the amount of thermal energy is added to said stream of fluidic medium through exothermic reaction(s). In embodiment, the reactive compound or a mixture of reactive compounds is introduced to the stream of fluidic medium preheated to a predetermined temperature. In embodiment, the reactive compound or a mixture of reactive compounds is introduced to the stream of fluidic medium preheated to a temperature essentially equal to or exceeding about 1700° C. In embodiment, preheating of the stream of fluidic medium to the predetermined temperature is implemented in the rotary apparatus.

In an embodiment, the method comprises generation of the heated fluidic medium by at least two rotary apparatuses integrated into the steel production facility, wherein the at least two rotary apparatuses are connected in parallel or in series. In embodiments, the method comprises generation of the heated fluidic medium by at least two sequentially connected rotary apparatuses, wherein the stream of fluidic medium is preheated to a predetermined temperature in at least a first rotary apparatus in a sequence, and wherein said stream of fluidic medium is further heated in at least a second rotary apparatus in the sequence by inputting an additional amount of thermal energy into the stream of preheated fluidic medium propagating through said second rotary apparatus. In an embodiment, in said method, in at least the first rotary apparatus in the sequence, the stream of fluidic medium is preheated to a temperature essentially equal to or exceeding about 1700° C. In an embodiment, in said method, the additional amount of thermal energy is added to the stream of fluidic medium propagating through said at least second rotary apparatus in the sequence by virtue of introducing the reactive compound or a mixture of reactive compounds into said stream. In an embodiment, the method comprises introducing the reactive compound or a mixture of reactive compounds into a process or processes related to the production of steel. Such process or processes can for example be implemented in a furnace configured for steel making.

In an embodiment, in said method, the heated fluidic medium generated by the at least one rotary apparatus is selected from the group consisting of a feed gas, a recycle gas, a make-up gas, and a process fluid. In an embodiment, in said method, the fluidic medium that enters the rotary apparatus is an essentially gaseous medium.

In an embodiment, the method comprises generation of the heated fluidic medium in the rotary apparatus. In embodiments, in said method, the fluidic medium to be heated in the rotary apparatus comprises any one of: air, steam ($H_2O$), nitrogen ($N_2$), hydrogen ($H_2$), carbon dioxide ($CO_2$), carbon monoxide (CO), methane ($CH_4$), or any combination thereof. Any other gas can be utilized where appropriate. In an embodiment, in said method, the fluidic medium to be heated in the rotary apparatus is a recycle gas recycled from off-gases, such as exhaust gases, generated from the reacting steel pre-cursor materials, such as iron or iron ore and carbon, during the steel manufacturing process. In embodiments, the pre-cursor materials hence include carbon and iron. The pre-cursor(s) may be iron oxide so that the method is effective to produce iron from the iron oxide. The pre-cursor(s) may be coal so that the method is effective to produce coke from the coal.

In embodiment, the method further comprises generation of the heated fluidic medium, such as gas, vapor, liquid, and mixtures thereof, and/or heated solid materials, outside the rotary apparatus through a process of heat transfer between the heated fluidic medium generated in the rotary apparatus and any one of the above-mentioned substances bypassing the rotary apparatus.

In embodiments, the method further comprises supplying the heated fluidic medium generated by the at least one rotary apparatus or in the at least one rotary apparatus into at least one heat-consuming unit within the steel production facility, the heat-consuming unit being provided as any one of: (i) a furnace, a kiln or a reactor configured for making steel, (ii) a sintering/pellet plant configured to sinter iron ore into iron ore sinter/pellets, (iii) a coke plant configured to coke coal into coke, (iv) a post-processing unit configured for post-processing of a steel product via any one of: heat treatment, upgrading the steel product with a source of carbon (carburizing), casting and/or rolling, (v) a reactor or a series of reactors configured for the endothermic reactions in steel production, in particular, for the endothermic reactions of off-gases generated in steel production, or (vi) any combination thereof.

In embodiments, the process of making steel (i) involves production of molten iron in a blast furnace or production of direct reduced iron (DRI) in a process unit, such as a furnace, a kiln or a reactor.

In embodiments, the method further comprises supplying the heated fluidic medium generated by the at least one rotary apparatus or in the at least one rotary apparatus into at least one heat-consuming unit within the steel production facility, the heat-consuming unit being provided as any one of: a heater, a burner, an oven, an incinerator, a dryer, a conveyor device, or a combination thereof. In some configurations, the method may further include supply of heated fluidic medium to a (pre)heater configured for (pre)heating of steelmaking ladles (vessels used to transport and pour out molten metal).

In embodiment, the method further comprises increasing pressure in the stream of fluidic medium propagating through the rotary apparatus.

In embodiment, in said method, the amount of electrical energy conducted as the input energy into the at least one rotary apparatus integrated in the steel production facility is within a range of about 5 percent to 100 percent.

In embodiment, in said method, the amount of electrical energy conducted as the input energy into the at least one rotary apparatus integrated in the steel production facility is obtainable from a source of renewable energy or a combination of different sources of energy, optionally, renewable energy.

In embodiment, in said method, the at least one rotary apparatus is utilized to balance variations, such as oversupply and shortage, in the amount of electrical energy (obtained through supply and/or production, for example), optionally renewable electrical energy, by virtue of being integrated, into the steel production facility, together with an at least one non-electrical energy operable heater device.

In another aspect, a steel production facility is provided, said steel production facility comprising at least one rotary apparatus configured to generate a heated fluidic medium and at least one heat-consuming unit configured to carry out a process of processes related to steel production, in accordance with the present disclosure.

In an embodiment, the steel production facility comprises at least one rotary apparatus configured to generate a heated fluidic medium and at least one heat-consuming unit configured to carry out a process of processes related to steel production, the at least one rotary apparatus comprising: a casing with at least one inlet and at least one exit, a rotor comprising at least one row of rotor blades arranged over a circumference of a rotor hub mounted onto a rotor shaft, and a plurality of stationary vanes arranged at least upstream of the at least one row of rotor blades, wherein the at least one rotary apparatus is configured to operated such that an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades respectively, whereby a stream of heated fluidic medium is generated, and wherein said at least one rotary apparatus is configured to receive an amount of input energy, the input energy comprising electrical energy, and to generate a heated fluidic medium for inputting thermal energy into at least one heat-consuming unit configured to carry out a process or processes related to steel production at temperatures essentially equal to or exceeding about 500 degrees Celsius (° C.).

In an embodiment, the at least one heat-consuming unit is a furnace configured for steel making, and the at least one rotary apparatus is connected to said furnace within the steel production facility. In an embodiment, the at least one heat-consuming unit is a furnace configured to react steel pre-cursor materials to produce steel, and the at least one rotary apparatus is connected to said furnace within the steel production facility. In embodiments, the at least one heat-consuming unit provided within the steel production facility is any one of: (i) a blast furnace for reducing iron ore to iron, whereby molten iron is produced, (ii) a sintering/pellet plant configured to sinter iron ore into iron ore sinter/pellets, (iii) a furnace, a kiln or a reactor configured for direct reduction of iron ore to direct reduced iron (DRI), (iv) a coke plant configured to coke coal into coke, (v) a post-processing unit configured for post-processing of a steel product via any one of: heat treatment, carburizing, casting and/or rolling, (vi) a reactor or a series of reactors configured for the endothermic reactions in steel production, in particular, for the endothermic reactions of off-gases generated in steel production, or (vii) any combination thereof. In embodiments, the at least one rotary apparatus is connected to and/or integrated into any one of units (i)-(vii).

In embodiments, the at least one heat-consuming unit is configured as any one of: a heater, a burner, an oven, an incinerator, a dryer, a conveyor device, or a combination thereof, and the at least one rotary apparatus is connected to any one of these heat-consuming units or any combination thereof within the steel production facility.

In embodiments, in said steel production facility, the at least one rotary apparatus comprises two or more rows of rotor blades sequentially arranged along the rotor shaft. In an embodiment, stationary vanes arranged into the assembly upstream of the at least one row of rotor blades are configured as stationary guide vanes. In an embodiment, the at least one rotary apparatus further comprises a diffuser area arranged downstream of the at least one row of rotor blades. The diffuser area may be configured with or without stationary diffuser vanes. In some configurations, vaned diffuser may be implemented as a plurality of stationary vanes arranged into an assembly downstream of the at least one row of rotor blades.

In an embodiment, the at least one rotary apparatus provided within said steel production facility is further configured to increase pressure in the fluidic stream propagating therethrough.

In an embodiment, the at least one heat-consuming unit configured to carry out steel production is a furnace configured to react steel pre-cursor materials to produce steel In some configurations, the at least one rotary apparatus provided within said steel production facility is configured to implement a fluidic flow, between the inlet and the exit, along a flow path established in accordance with any one of: an essentially helical trajectory formed within an essentially toroidal-shaped casing; an essentially helical trajectory formed within an essentially tubular casing, an essentially radial trajectory, and along the flow path established by virtue of the stream of fluidic medium in the form of two spirals rolled up into vortex rings of right and left directions.

In a further aspect, an assembly is provided and comprises at least two rotary apparatuses according to some previous aspect, said rotary apparatuses being connected in parallel or in series.

In a further aspect, an arrangement is provided and comprises at least one rotary apparatus according to some previous aspect, said at least one rotary apparatus being connected to at least one furnace.

In a further aspect, a steel production facility is provided and is configured to implement a steel production process through a method according to some previously defined aspects and embodiments; and it comprises at least one rotary apparatus according to some previous aspect.

The utility of the present invention arises from a variety of reasons depending on each particular embodiment thereof.

Overall, embodiments offer an electrified rotary fluid heater to provide high temperature fluids, such as gases, to be used in the production of steel instead of fuel-fired heaters, for example. The presented method enables inputting thermal energy into furnaces used in steel production or steel pre-cursor production operating at high- and extremely high temperatures, such as temperatures generally exceeding 500° C. The invention offers apparatuses and methods for heating the fluidic substances to the temperatures within a range of about 500° C. to about 2000° C., i.e. the temperatures used in steel production.

The invention further offers the methods for thermally treating off-gases generated at various stages of steel making, wherein thermally treated off-gases can further be used for syngas production in endothermic reactor(s) integrated into the steel production facility, according to the embodiments.

Steel production typically employs utility with high demand for thermal energy and hence, for heat consumption, such as fired heaters, for example. Said heat-consuming utilities are used to heat fluids to the temperatures needed for the steel production process. The invention presented herewith enables replacing conventional heat-consuming utilities, such as fuel fired heaters, by a rotary apparatus. In the method, the advantages accompanied by replacing fired heaters with the rotary apparatus include at least:

- Support for electrified heating;
- Elimination or at least significant reduction of greenhouse gas (such as NO, $CO_2$, CO, $NO_X$), other harmful components (such as for example HCl, $H_2S$, $SO_2$, and heavy metals) originating from fuels, particle emissions and soot emissions;
- Reduced volume of a heater: the volume of the rotary apparatus is at least one order of magnitude smaller as compared to the volume of conventional process heaters or heat exchangers;
- Decreased investment costs;
- Improved safety in case of using flammable, hazardous fluids/gases;
- Feasibility in handling large volumes of gases;
- Absence of pressure drop;
- Possibility of using the rotary (heater) apparatus also for compression of gases (a blower function);
- Independency on temperature difference in direct heating of gases. Temperature rise in the rotary apparatus can be in range of about 10 to 1700° C. or more;
- Possibility for using the rotary apparatus in indirect heating of fluids optionally by optimizing temperature difference in heat exchanger(s);
- Possibility for at least partial recycling of hot process gases, thus improving and making simpler the heat recovery and improving energy efficiency;
- Possibility for further raising the temperature of gases to be heated by adding reactive chemicals which further increase the gas temperature up to e.g. 2000° C. or higher by exothermic reactions.

In embodiments, the rotary apparatus can be used to replace conventional fired heaters or process furnaces for direct or indirect heating in steel production. Traditionally such heat has been mainly produced through burning of fossil fuels leading to significant $CO_2$ emissions. Replacing fossil fuels with wood or other bio-based materials has significant resource limitations and other significant environmental implications such as sustainable land use. With the increased cost-efficiency of renewable electricity, namely the rapid development of wind and solar power, it is possible to replace fossil fuel firing with the rotary apparatus powered with renewable electricity leading to significant greenhouse gas emission reductions. The rotary apparatus allows electrified heating of fluids to temperatures up to 1700° C. and higher. Such temperatures are difficult or impossible to reach with current electrical heating applications.

The rotary apparatus can be used for direct heating of process gases, inert gases, air or any other gases or for indirect heating of process fluids (liquid, vapor, gas, vapor/liquid mixtures etc.). Heated fluid generated in said rotary apparatus can be used for heating any one of gases, vapor, liquid, and solid materials. In particular, the rotary apparatus can be used for direct heating of recycled gas recycled from exhaust gases generated from the reacting of iron or iron ore and carbon during steel production. The rotary apparatus can at least partly replace- or it can be combined with (e.g. as pre-heater) multiple types of furnaces, heaters, kilns, gasifiers, and reactors that are traditionally fired or heated with solid, liquid or gaseous fossil fuels or in some cases bio-based fuels, including furnaces used in steel production. Heated gases can be flammable, reactive, or inert and can be recycled back to the rotary apparatus. In addition to heating, the rotary apparatus may act as combined blower and heater allowing to increase pressure and to recycle gases.

Heated fluids, such as gases, can be used in a variety of applications. A heated object can be a solid material, liquid or gas, which gas further takes part in a number of reactions or is used as a heating media. Hence, hot gases can be used for heating solid materials like in steel production factories. Furthermore, the rotary apparatus(es) 100 can be applied, within the steel production process(es)/facilities, for heat provision and fluidization in fluidized bed applications, including, but not limited with: drying of solids, solid-catalysed reactors with gaseous reactants, iron ore reduction, and carburizing.

The invention enables the reduction of greenhouse gas ($CO$, $CO_2$, $NO_x$) and particle emissions when replacing fired heaters. By using the rotary apparatus, it is possible to have closed or semi-closed heating loops for processes, and to improve energy efficiency of the processes by reducing heat losses through flue gas. In conventional heaters, flue gases can be recycled only partly.

Additionally, the present solution enables improved optimization of the temperature difference(s) in the heat exchangers in indirect heating.

The invention further provides for flexibly using electrical energy, such as electrical energy obtainable from renewable sources. Production of renewable energy varies on daily basis and even on hourly basis. The invention allows for balancing renewable electricity production by integration of the rotary apparatus disclosed herewith with conventional fuel-operated (fuel-fired) heaters to provide heat to the steel production process, and particularly to the high temperature mixing of iron and carbon, for example.

The invention further enables a reduction in the on-site investment costs as compared to traditional fossil fired furnaces.

The expression "a number of" refers hereby to any positive integer starting from one (1), e.g. to one, two, or three. The expression "a plurality of" refers hereby to any positive integer starting from two (2), e.g. to two, three, or four. The terms "first" and "second", are used hereby to merely distinguish an element from another element without indicating any particular order or importance, unless explicitly stated otherwise.

The term "gasified" is utilized hereby to indicate matter being converted into a gaseous form by any possible means.

Different embodiments of the present invention will become apparent by consideration of the detailed description and accompanying drawings.

DETAILED DESCRIPTION OF THE EMBODIMENTS

Detailed embodiments of the present invention are disclosed herein with the reference to accompanying drawings.

Figure 1:
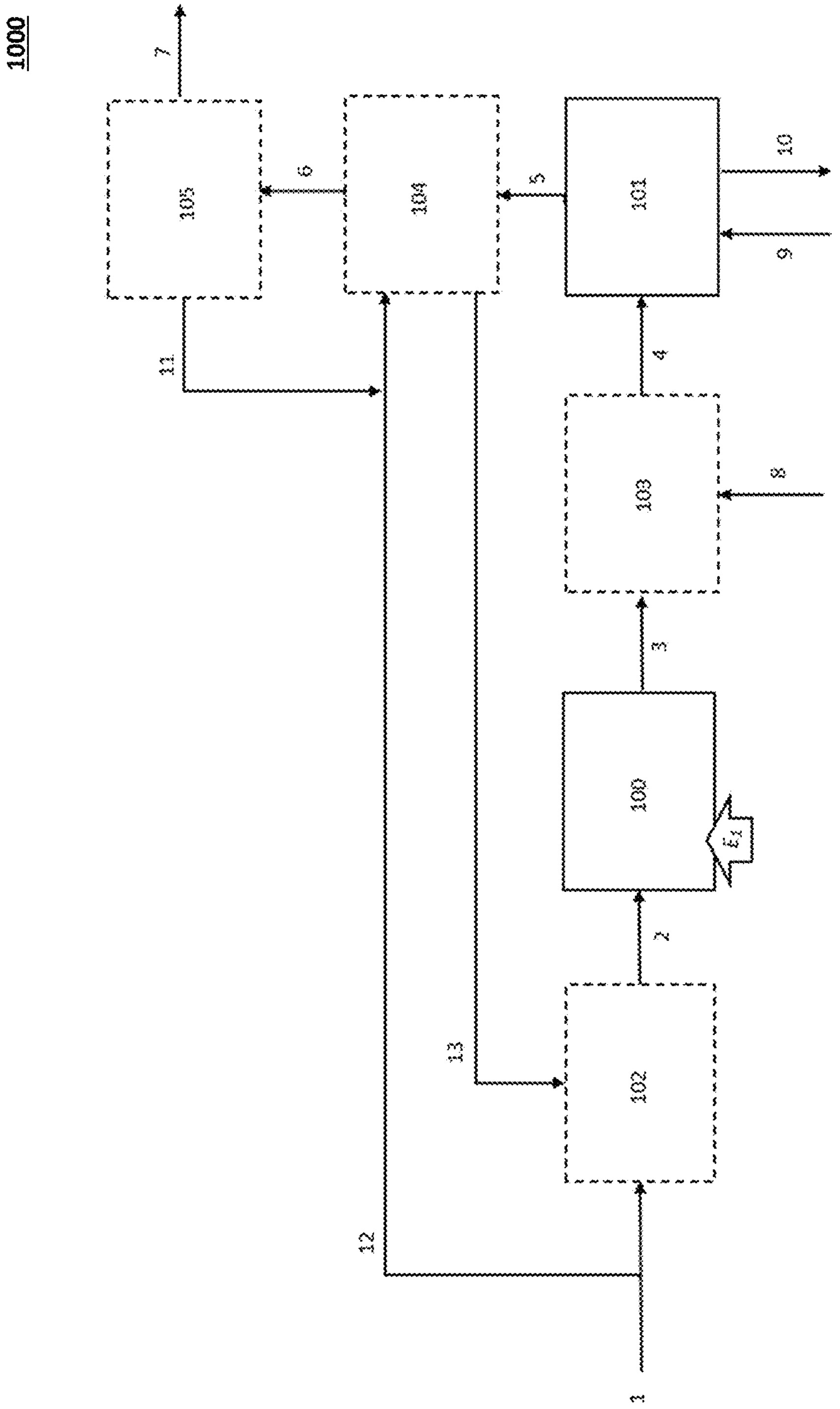
FIG. 1 is a block diagram representing, at 1000, a layout for a high temperature heat-consuming process facility provided as a steel manufacturing process facility configured to implement a method according to the embodiments.

FIG. 1 is a block diagram representing, at 1000, a layout for a high temperature steel manufacturing process facility configured to implement a method according to the embodiments. FIGS. 2A-2F and FIGS. 3B-3H describe apparatuses and methods according to the embodiments. FIG. 3A generally describes a process and related facility 3000 for manufacturing of steel and capable of incorporating rotary apparatus(es) as described herein below. FIG. 3F illustrates a process and related facility 4000, according to the embodiments. Figures and related examples serve illustrative purposes and are not intended to limit applicability of the inventive concept to the layouts expressly presented in this disclosure. Block diagram sections shown by dotted lines are optional.

The heat-consuming process facility 1000, 3000, 4000 is a facility configured to carry out a heat-consuming industrial process or processes 101 at temperatures essentially equal to or exceeding 500 degrees Celsius (° C.). Facility 1000, 3000, 4000 can be represented with an industrial plant, a factory, or any industrial system comprising equipment designed to perform the above-mentioned heat-consuming industrial process(es). The heat-consuming industrial process or processes 101 may be represented with any one of: sintering or pelletising iron ore to produce sinter or pellets (rf. 317, FIGS. 3A, 3C, 3F, Example 2), coking of coal to form coke (rf. 308, FIG. 3B, Example 1), reduction of iron oxide to form iron using carbon coke (rf. 300, FIG. 3D, Example 3) or hydrogen (rf. 504, FIG. 3G, Example 6), oxygenating molten iron to produce steel (rf. 328, FIG. 3F), post-processing of steel (rf. 334, FIG. 3E, Example 4), reactor(s) for implementing high-temperature catalytic reactions for production of hydrogen/syngas (rf. 406, FIG. 3F), or any combination thereof.

In embodiments, facility 1000, 3000, 4000 is configured to carry out the heat-consuming industrial process(es) at temperatures within a range of 500-1700° C. In embodiments, facility 1000, 3000, 4000 is configured to carry out the heat-consuming industrial process(es) which start at temperatures essentially within a range of about 800-900° C. or higher. In embodiments, facility 1000, 3000, 4000 is configured to carry out the heat-consuming industrial process(es) at temperatures essentially equal to—or exceeding 1000° C. In embodiments, facility 1000, 3000, 4000 is configured to carry out the heat-consuming industrial process(es) which start at temperatures essentially within a range of about 1100-1200° C. or higher. In embodiments, the facility is configured to carry out the heat-consuming industrial process(es) at temperatures essentially equal to—or exceeding 1200° C. In embodiments, the facility is configured to carry out the heat-consuming industrial process(es) at temperatures within a range of about 1300-1700° C. In embodiments, the facility is configured to carry out the heat-consuming industrial process(es) at temperatures essentially equal to—or exceeding 1500° C. In embodiments, the facility is configured to carry out the heat-consuming industrial process(es) at temperatures essentially equal to—or exceeding 1700° C. In some embodiments, the facility can be configured to carry out industrial process(es) at temperatures that exceed 1700° C., such as at 2000° C. or higher, such as within a range of about 1700° C. to about 2500° C. The facility can be configured to carry out industrial process(es) at about 1700° C., at about 1800° C., at about 1900° C., at about 2000° C., at about 2100° C., at about 2200° C., at about 2300° C., at about 2400° C., at about 2500° C., and at any temperature value falling in between the above-mentioned temperature points. It should be pointed out that facility 1000, 3000, 4000 is not excluded from carrying out of at least a part of industrial processes at temperatures below 500° C.

Further description utilizes reference numbers as illustrated on FIG. 1 unless otherwise explicitly noted. Heat-consuming process(es) and related operational units configured to carry out said heat-consuming processes within the facility 1000 and referred to as heat-consuming process unit(s)/utility(/ies) is/are collectively designated by a reference numeral 101. The facility 1000 may comprise a number of operational units 101 configured to perform same or different heat-consuming processes. In embodiments, the operational unit 101 comprises or consists of at least one heat-consuming device configured to carry out a heat-consuming process. In embodiment, the unit 101 is a furnace for making steel (rf. also 300, FIGS. 3A, 3D, 3F and 504, FIG. 3G). Steel production includes several high temperature processing steps where typically fuel gas or coal is incinerated to achieve high temperatures. Such operating steps include pre-heating of gases prior to the gases entering the blast furnace, coke plant or sintering plant, reduction of iron ore with gas, such as hydrogen, where the reaction is endothermic and requires heat to progress, and post-processing of semi-finished or finished steel products by means of casting and/or hot rolling where steel is heated above its recrystallisation temperature by burning natural gas or oil for heat generation. Semi-finished or finished steel product may include for example, steels slabs, plates or sheets.

Iron ore reduction to iron typically takes place in a furnace, such as blast furnace, but it can also be accomplished in gas-solid process units, such as kilns or (fluidized bed) reactors. The latter are typically used in production of so-called direct reduced iron (DRI) or sponge iron. In the mentioned appliances, iron oxide ore is reduced to iron through the removal of oxygen. Oxygen removal from iron oxide ore may be accomplished by heating the iron oxide ore in a carbon monoxide/hydrogen rich atmosphere, either through the introduction of carbon monoxide and hydrogen gas, or by the addition of a source of carbon monoxide and hydrogen, such as coal or coke.

In some embodiments, in the blast furnace, iron oxide ore is reduced to iron with help of coke. Carbon in coke is oxidised to CO and $CO_2$. When coke is used as a reductant, the Redox reaction is exothermic, and the blast furnace can operate in an autothermal mode where no additional heat source is needed to maintain the high reaction temperature. In modern furnaces, additional fuel like natural gas can be fed into furnace to boost the temperature higher and to increase the reduction efficiency since the natural gas primarily comprises methane that acts as a reductant. Another means to increase the efficiency is through so-called hot blast, which is air pre-heated to a temperature within a range between about 900° C. to about 1300° C. that provides a boost for temperature by incinerating coke or coal directly.

Blast furnace off-gas is typically a mixture rich in nitrogen and carbon dioxide, which are not flammable. The rest consists of carbon monoxide, which has a fairly low heating value, and hydrogen. Much of the $CO_2$ emissions arising from steel manufacturing originate from the blast furnace heating of iron and coke and are emitted in the form of furnace off-gas. There is a high interest in reducing $CO_2$ emissions in steel industry; one way to do it is to introduce additional renewable hydrogen into the off-gas stream and perform a reverse water-gas shift (RWGS) reaction to convert $CO_2$ and hydrogen into CO and water. CO can then be coupled with additional hydrogen to yield a mixture of CO and $H_2$ called synthetic gas (syngas). Syngas can be used as a raw material for methanol or Fischer-Tropsch hydrocarbons that have value as raw material for chemical industry. The syngas may also be recycled in the system to serve as a reductant of iron oxide into iron.

One challenge with the RWGS reaction is that reaction equilibrium is favourable to products only in temperatures above 1000° C. Heating feed gas mixture to such temperatures typically requires fossil-fuel fired furnaces that produce $CO_2$ emissions and partially neutralise the benefits in applications such as blast furnace off-gas modification to syngas. The rotary apparatus of the present invention can be applied to bring the feed to reaction temperature of about 1000-1200° C. without additional $CO_2$ emissions. Adding extra hydrogen into the reaction mixture helps with reaching desired product composition, as hydrogen pushes the equilibrium $CO_2$ concentration down. This may allow operation of an RWGS reactor at temperatures below 1000° C. but still requires temperatures above 650-700° C. and leads to increase in reactor size due to high hydrogen recycle. The reaction requires a catalyst and is mildly endothermic, so product temperature is lower than feed temperature and additional rotary apparatus/catalyst cycles or product recycling may be required to reach desired reaction equilibrium.

An alternative for RWGS is dry reforming, where methane reacts with $CO_2$ in the blast furnace off-gas to produce hydrogen and carbon monoxide (CO). A similar high temperature, catalytic and endothermic reaction scheme applies to dry reforming as well, but methane as raw material is easier to access than green hydrogen. The resulting syngas is higher in $CO/H_2$ ratio than that of RWGS, which may limit its applications.

Another way to mitigate $CO_2$ emission from steel industry is to use hydrogen instead of coal as a reducing agent. Unlike coke reduction, hydrogen reduction is endothermic reaction and requires additional heat input to maintain the reaction temperature. This additional heat input typically comes from excess hydrogen that is incinerated in the blast furnace. Application of the rotary apparatus in iron ore reduction with hydrogen would be to supply this additional heat by heating the hydrogen to the reaction temperature or above and to recycle gaseous reaction products, mainly water and unreacted hydrogen, at least partially back to the reduction operation for optimal heat recovery. In direct iron reduction (DRI) applications using hydrogen as reducing agent, hydrogen gas heated in the rotary apparatus can be used in gas-solid process units, such as kilns or (circulating) fluidized bed type reactors, where solid iron ore is contacted with hot hydrogen gas. Additionally or alternatively, air or other gas heated in the rotary apparatus can be used as a heat transfer medium to indirectly (pre)heat solid iron ore feedstocks in a fluidized bed system, for example (rf. Example 7).

Further application of the rotary apparatus in steel industry is hot rolling where the rotary apparatus would recycle hot air or nitrogen around the steel sheets to bring them above recrystallisation temperature. Recycling the hot air or nitrogen would improve the energy efficiency Steel manufacturing has high thermal (heat) energy demand and consumption and, in conventional solutions (viz. outside the heat integration scheme 1000 presented herewith), produce considerable industrial emissions such as carbon dioxide into the atmosphere. The present disclosure offers apparatuses and methods for inputting thermal energy into steel manufacturing, 101 which has high heat energy demand, whereby energy efficiency in said process can be markedly improved or the amount of air pollutants released into the atmosphere is reduced or both. Layout 1000 (FIG. 1) schematically outlines these improved facility and method.

In embodiments, the method comprises generation of a heated fluidic medium such as air or oxygen or fuel enriched air by virtue of a rotary heater unit 100 comprising or consisting of at least one rotary apparatus, hereafter, the apparatus 100. For the sake of clarity, the rotary heater unit is designated in the present disclosure by the same reference number, 100, as the rotary apparatus. The rotary heater unit is preferably integrated into the process facility 1000. In an embodiment, the heated fluidic medium is produced by the at least one rotary apparatus, however, in some embodiments a plurality of rotary apparatuses may be used in series or in parallel.

The rotary apparatus 100 can be provided as a standalone apparatus or as a number of apparatuses arranged in series (in sequence) or in parallel. One or more apparatuses may be connected to a common heat-consuming unit 101, such as a furnace, for example. Connection may be direct or through a number of heat exchangers.

The heat-consuming unit(s) 101 is/are provided as one or furnaces or other utilities adapted to implement processes related to manufacturing of steel. In some configurations, thermal energy of the fluid, such as gas, heated in 100 is used to run endothermic reactions in the unit 101 (rf. description to FIG. 3F). In such as case, the fluid heated in 100 forms, at least partly, the process fluid of 101. In some other configurations, the fluid heated in 100 transfers its thermal energy to a process fluid used in the heat-consuming unit/process 101 to indirectly provide heat of reaction to said process. In an event of indirect heating, the fluid heated in 100 may be same or different than the process fluid used in the heat-consuming unit/process 101; however, typically it is different. For the purposes of the invention the terms "process fluid", "process stream" or "process fluid stream" are used to indicate any one of gas, liquid, vapor, solid, including pelletized, granulized or powered materials, or a mixture thereof. In configurations which involve said indirect heating, the thermal energy added into the fluid in the rotary apparatus 100 is transferred to the heat-consuming unit/process 101 through the use of so-called "heat exchanger"-type configurations represented, in the present context, with any existing fired heater, reactor or furnace, or any conventional heat exchanger device, wherein all these devices are viewed as heat-consuming units 101. In still further configurations, the fluid, such as gas, heated in the rotary apparatus 100 does not necessarily transfer its thermal energy to the heat-consuming unit 101, but the heat may be used to run endothermic reactions within same or subsequent rotary apparatus unit(s) 100 (not shown).

The heat-consuming unit(s)/utility(/ies) 101 for steel manufacture is typically one or more furnaces. In some configurations, a number of rotary apparatus units can be connected to several heat-consuming utilities. Different configurations may be conceived, such as n+x rotary apparatuses connected to n utilities (e.g. furnaces), wherein n is equal to or more than zero (0) and x is equal to or more than one (1). Thus, in some configurations, the facility 1000 and, in particular, the rotary heater unit 100, may comprise one, two, three or four parallel rotary apparatus units connected to the common heat-consuming unit, such as a furnace, for example; the number of rotary apparatuses exceeding four (4) is not excluded. When connecting, in parallel, a number of rotary apparatuses to the common heat-consuming unit, one or more of said apparatuses 100 may have different type of drive engine, e.g. the electric motor driven reactor(s) can be combined with those driven by steam turbine, gas turbine and/or gas engine.

In an embodiment, an amount of input energy $E_1$ is conducted into the at least one rotary apparatus 100 integrated, as a (rotary) heater unit, into the process facility 1000. The input energy $E_1$ preferably comprises electrical energy. In embodiments, the amount of electrical energy conducted as the input energy into the at least one rotary apparatus integrated in the heat-consuming process facility is provided within a range of about 5 to about 100 percent, preferably, within a range of about 50 to about 100 percent. Thus, the amount of electrical energy conducted as the input energy into the at least one rotary apparatus integrated in the heat-consuming process facility can constitute any one of: 5, 10, 15, 20, 25, 30, 35, 40, 45, 50, 55, 60, 65, 70, 75, 80, 85, 90, 95, and 100 percent (from the total energy input), or any intermediate value falling in between the above indicated points.

Electrical energy can be supplied from external or internal source. In practice, electrical input energy E1 supplied into the apparatus can be defined in terms of electric power, the latter being defined as a rate of energy transfer per unit time (measured in Watt).

Particulars of some embodiments of the invention, as implemented in the facility layout of FIG. 1, are described along the following lines. For FIG. 1, the following designations are used for the members. Streams: 1. Feed; 2. Preheated feed or feed mixture; 3. Feed heated by virtue of a rotary apparatus 100; 4. Feed further heated in an additional (booster) heater unit configured to raise/enhance temperature through (exothermic) chemical reactions, for example; 5. Hot fluidic medium exiting the heat-consuming process 101; 6. Fluidic medium directed to purification; 7. Product stream and/or waste gas; 8. Reactive compound or a mixture of reactive compounds, e.g. a reactive chemical or chemicals, or a support fuel used to increase temperature of the fluid/gas in the additional heater unit 103; 9. Process stream (solid, liquid, gas, vapor or a mixture thereof) to be heated by the hot fluidic medium in the heat-consuming process 101 (indirect heater applications); 10. Heated process stream (solid, liquid, gas, vapor or a mixture thereof) sent for further processing and/or storage (indirect heater applications); 11. Recycle stream exiting from purification; 12. Feed stream to heat recovery; 13. Hot fluidic stream from heat recovery. Sections (units): 100. Rotary heater unit (rotary apparatus(es)); 101. Heat-consuming operational (process) unit (a furnace); 102. Preheater unit; 103. Additional heating apparatus (booster heater unit); 104. Heat recovery unit; 105. Purification unit.

The rotary apparatus 100 is configured to receive a feed stream 1, hereafter, the feed 1. Overall, the feed 1 can comprise or consist of any fluid, such as liquid or gas or a combination thereof, provided as a pure component or a mixture of components. The feed can be a feedstock gas, a process gas, a make-up gas (a so-called replacement/supplement gas), and the like. Gaseous feed can include inert gases (air, nitrogen gas, and the like) or reactive, e.g. oxygen, flammable gases, such as hydrocarbons, or any other gas like hydrogen and ammonia. Selection of the feed is process-dependent; that is, the nature of the heat-consuming process 101 (and indeed a specific industry/an area of industry said heat-consuming process 101 is assigned to) implies certain requirements and/or limitations on the selection of feed substance(s). Therefore, in the manufacture of steel, the feed 1 is typically air or a combination of air and additional oxygen or also combustion fuel. In the coking of coal to form coke, the feed 1 is typically an oxygen-free gas, such as pre-heated carbon dioxide or an inert gas. Additionally or alternatively, feed 1 may include any one of: (water) steam, nitrogen ($N_2$), hydrogen ($H_2$), carbon dioxide ($CO_2$), carbon monoxide (CO), and methane ($CH_4$).

It is preferred that the feed 1 enters the apparatus 100 in essentially gaseous form. Preheating of the feed or conversion of liquid or essentially liquid feed(s) into a gaseous form can be performed in an optional preheater unit 102 configured as a (pre)heater apparatus or a group of apparatuses. In the preheater unit 102, the feed stream(s) originally provided in a gaseous form (e.g. the process gas or gases) can be further heated (e.g. superheated). In the preheater unit 102, the feed 1 can be vaporized if not already in gas form and optionally superheated.

The preheater unit 102 can be any conventional device/system configured to provide heat to fluidic substance. In some configurations, the preheater unit 102 can be a fired heater (viz. a direct-fired heat exchanger that uses hot combustion gases (flue gases) to raise the temperature of a fluidic feed, such as a process fluid, flowing through the coils arranged inside the heater). Additionally or alternatively, the preheater unit 102 can be configured to exploit energy made available by the other units in the heat-consuming facility (for example by extracting thermal energy from hot stream 13 arriving from heat recovery). The preheater unit 102 can thus be configured to utilize other steam streams, as well as electricity and/or waste heat streams (not shown).

Depending on a heat-consuming process and related equipment, which in this embodiment is steel production, the feed stream 1 used to produce the heated fluidic medium, such as air, by virtue of the rotary heater unit (the apparatus 100) comprises a virgin feed (fresh feed) and/or recycle stream(s). Hence, the feed 1 may consist of any one of fresh feed, recycle (fluidic) stream, and a mixture thereof. Stream 2 representing (pre)heated feed may include, in addition to feed 1, all recycle streams, such as those arriving from a purification section 105 and/or a heat recovery section 104.

In the rotary heater unit/the rotary apparatus 100, the temperature is raised to a level which is required by the heat-consuming process 101 or to a maximum level achieved by the rotary apparatus. In an event the temperature rise achieved by the rotary apparatus 100 is not sufficient for the heat-consuming process and/or if, for example, the temperature of the fluid needs to be raised again after it has transferred its heat to the heat-consuming process, further temperature rise can be achieved by virtue of arranging additional heater units (100B, 103), further referred to as "booster" heater(s), downstream of the rotary heater unit 100 (100A); rf. description to FIG. 2B. Each additional heater unit comprises or consists of an additional heating apparatus implemented according to the description below.

In heat-consuming processes, such as the steel production described herein, the main sources of heat consumption are heating of working fluids and/or associated equipment and endothermic reactions (reactions that require external energy to proceed). In some applications it is feasible to recover heat from heat-consuming processes 101. Heat recovery section is indicated on FIG. 1 with ref. no. 104. Recovered heat can be further used for heating the feed stream 1 and/or a recycle stream (separate recycle stream is indicated on FIG. 1 with ref. no. 11).

Heat recovery may be arranged through collecting gases exiting the process unit 101 and recycling these gases to the preheater unit 102 and/or the rotary apparatus 100. The heat recovery installation 104 may be represented with at least one heat exchanger device (not shown). Heat exchangers based on any appropriate technology can be utilized. Heat recovery may be optional for heating feed gas if the heat is consumed elsewhere or if it is not possible to recover heat due to safety- or any other reason.

In the facility layout 1000, the heat recovery unit 104 can be arranged before and/or after the preheater 102. In the latter configuration, the heat recovery unit 104 is arranged to recover heat from the hot fluidic medium (stream 5) flowing from the steel manufacturing process 101, which may be further utilized to heat the feed stream 1 and recycle stream 11. On the other hand, when the heat recovery unit 104 is arranged before the preheater 102, the feed 1 is first led to the unit 104 (as stream 12) and then returned to preheating 102 as stream 13. In such a case, unit 104 acts as a first preheater.

In some instances, gases require purification, e.g. from dust and fine particles, before being directed to heat recovery. Purification can be done by a series of filters, for example, arranged before the heat recovery section 104 (not shown). Additionally or alternatively the gases exiting the process unit 101 may be directed to a purification unit 105 (bypassing the unit 104), and, after purification, returned to the heat recovery (not shown).

Process gas may contain in addition to valuable products also unwanted impurities and side products which may accumulate or/and be harmful for heater apparatus(-es) 100, 103 and/or the process units 101 through causing corrosion and poisoning catalytic beds. Purification and separation of streams discharged from heat-consuming processes 101 is performed in the purification unit 105. Unit 105 can comprise a number of appliances, such as filters, cyclones etc., adapted to mechanically remove dust and solid particles. Any conventional purification/separation methods and devices may be utilized. Exemplary purification/separation methods include, but are not limited to: cryogenic separation methods, membrane processes, Pressure Swing Adsorption (PSA), distillation, absorption, and any combination of these methods. The unit 105 may also comprise device configured to increase gas pressure by compression, for example. Typically, purification units 105 operate at lower temperatures than process units 101; therefore, prior to entering the purification unit, a product gas stream is cooled down (in the heat recovery 104, for example). To minimize the extent of deterioration of reactor beds in 101, it is also important to control composition of the recycle gas 11.

Purification unit 105 can be further adapted to purify waste gas(es), e.g. carbon dioxide, for further carbon capture. Waste gases discharged from the steel production facility as stream 7 (FIG. 1) can thus be further directed to carbon capture (not shown). Suitable methods for purification of waste gases include for example PSA, distillation, absorption, etc.

Heated fluidic medium required for carrying out the heat-consuming process(es) 101 is generated by virtue of at least one rotary apparatus 100.

In an embodiment, the heated fluidic medium is generated in the rotary apparatus 100, where an amount of thermal energy is added directly into fluidic medium propagated through said apparatus. In such an event, the heated fluidic medium generated in the rotary apparatus may be for example a process gas, such as a hydrocarbon-containing gas (e.g. methane) (see FIG. 1, streams 1-4, particularly stream 2), while the hot fluidic medium 5 that exits the heat-consuming unit 101 may represents a product-containing stream. In direct heating, streams 1-5 relate to a working- or process fluid. Direct heating of process fluids is described in more detail with regard to FIG. 3F.

The heated fluidic medium generated in the rotary apparatus can be further used as a carrier to transfer thermal energy to the heat-consuming unit 101 configured to implement or mediate a heat-consuming process or processes (101) related to manufacturing of steel. For example, an inert gas such as air, nitrogen or steam ($H_2O$) can be heated in the rotary apparatus 100 and further used to convey the heat generated by the rotary apparatus to the furnace adapted to perform the process 101 related to manufacturing of steel. In this regard, generation of a heated medium (e.g. fluidic or solid streams exploited by the process 101) can be performed outside the rotary apparatus through a process of heat transfer between the heated fluidic medium generated in the rotary apparatus and a suitable medium exploited by the process 101 and thus bypassing the rotary apparatus. FIG. 1 thus shows stream 9 (a process stream) bypassing the rotary apparatus 100 and designating, in present context, the feed/process stream (e.g. iron ore sinter, coke and/or limestone), while streams 1-4 arriving to the process unit 101 via the rotary heater 100 designate fluidic medium (e.g. air, nitrogen, steam or other inert heating media) directed to the process unit 101 for heating the "cold" process stream 9. Use of inert hot gases as heating media in indirect heating applications may be preferred when the process streams to be heated are at high pressure or under vacuum. Stream 10 represents a "hot" process stream and/or a product stream, respectively. In an event the unit 101 is a blast furnace for producing steel (as described with reference to FIG. 3D), stream 10 represents a molten product-containing stream (molten metal iron, designated on FIG. 3D with reference numeral 324), while stream 5 represents, in turn, a stream of inert fluidic medium (same as 1-4) exiting the unit/process 101. In indirect heating, streams 9 and 10 relate to a working- or process fluid, whereas streams 1-5 represent a heat-transfer medium. Hence, in indirect heating, the unit 101 acts as a "heat-exchanger" type of device which enables transfer of thermal energy between two fluids flowing therethrough without any direct contact between said fluids.

The rotary apparatus 100 configured for generating the heated fluidic medium to be supplied into the steel production facility according to the embodiments comprises a rotor comprising a plurality of rotor blades arranged into at least one row over a circumference of a rotor hub or a rotor disk mounted onto a rotor shaft, and a casing with at least one inlet and at least one exit, the rotor being enclosed within the casing. In the apparatus 100, an amount of thermal energy is imparted to a stream of fluidic medium directed along a flow path formed inside the casing between the inlet and the exit by virtue of a series of energy transformations occurring when said stream of fluidic medium passes through the at least one row of rotor blades when propagating inside the casing of the rotary apparatus, between the inlet and the exit, whereby a stream of heated fluidic medium is generated.

Implementation of the rotary apparatus 100 may generally follow the disclosures of a rotary reactor apparatus according to the U.S. Pat. No. 7,232,937 (Bushuev), U.S. Pat. No. 9,494,038 (Bushuev) and U.S. Pat. No. 9,234,140 (Seppälä et al), and of a radial reactor apparatus according to the U.S. Pat. No. 10,744,480 (Xu & Rosic), the entire contents of which are incorporated by reference herewith. Any other implementation, which can be configured to adopt the method according to the embodiments, can be utilized.

In the patent documents referenced above, the rotary turbomachine-type apparatuses were designed as reactors for processing hydrocarbons, in particular, for steam cracking. General requirements for these applications are: rapid heating of gases, high temperature, short residence time, and plug flow (a flow model which implies no axial mixing). These requirements have led to designs where the turbomachine type reactors have several heating stages accommodated in a relatively small volume.

The present disclosure is based on an observation that the rotary apparatus (including, but not limited to the ones referenced above) can be electrified and used as a heater to generate the heated fluidic medium further supplied in the heat-consuming process 101, such as a process or processes related to manufacturing of steel. By integration of the rotary apparatus heater unit(s) into the heat-consuming process or processes, significant reductions in greenhouse gas- and particle emissions can be achieved. By way of example, the rotary apparatus can replace fuel-fired heaters in a variety of applications (described hereinbelow). The temperature range can be extended from about 1000° C. (generally achievable with the above referenced reactor devices) to up to at least about 1700° C. and further up to 2500° C. Construction of the rotary apparatuses capable of achieving these high temperatures is possible due to an absence of aerodynamic hurdles.

The rotary apparatus 100 integrated into the steel production facility according to the embodiments and configured to generate the heated fluidic medium for the method(s) according to the embodiment thus comprises the rotor shaft positioned along a horizontal (longitudinal) axis with at least one rotor unit mounted onto the rotor shaft. The rotor unit comprises a plurality of rotor (working) blades arranged over the circumference of a rotor hub or a rotor disk and together forming a rotor blade cascade. The rotary apparatus 100 thus comprises a plurality of rotor (working) blades arranged into at least one row over the circumference of a rotor hub or a rotor disk mounted onto the rotor shaft, and forming an essentially annular rotor blade assembly or rotor blade cascade.

In embodiments, the apparatus further comprises a plurality of stationary vanes arranged into an assembly disposed at least upstream of the at least one row of rotor blades. In this configuration, the rotary apparatus is operated such that the amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated.

In some embodiments, the plurality of stationary vanes can be arranged into a stationary vane cascade (a stator), provided as an essentially annular assembly upstream of the at least one row of rotor blades. The stationary vanes arranged into the assembly disposed upstream of the at least one row of rotor blades may be provided as stationary guide vanes, such as (inlet) guiding vanes (IGV), and be configured, in terms of profiles, dimensions and disposition thereof around the central shaft, to direct the fluid flow into the rotor in a predetermined direction such, as to control and, in some instances, to maximize the rotor-specific work input capability.

The rotary apparatus can be configured with two or more essentially annular rows of rotor blades (rotor blade cascades) sequentially arranged on/along the rotor shaft. In such an event, the stationary guide vanes may be installed upstream of the first row of the rotor blades, upstream of each row of rotor blades in the sequence, or upstream of any selected row of rotor blades in a sequential arrangement of the latter.

In embodiments, the rotary apparatus 100 further comprises a diffuser area arranged downstream of the at least one row of rotor blades (rotor blade cascade). In this configuration, the rotary apparatus is operated such that an amount of thermal energy is imparted to a stream of fluidic medium directed along a flow path formed inside the casing between the inlet and the exit by virtue of a series of energy transformations occurring when said stream of fluidic medium successively passes through the stationary guide vanes, the at least one row of rotor blades and the diffuser area, respectively, whereby a stream of heated fluidic medium is generated. The diffuser area can be configured with or without stationary diffuser vanes. In some configurations, a vaned or vaneless diffuser is arranged, in said diffuser area, downstream of the at least one rotor blade cascade. In some configurations, the diffuser can be implemented as a plurality of stationary (stator) vanes arranged into a diffuser vane cascade, provided as an essentially annular assembly downstream of the rotor.

The rotor, the stationary guide vanes and the diffuser area are enclosed within an internal passageway (a duct) formed in the casing.

In some configurations, such as described for example in U.S. Pat. No. 10,744,480 to Xu and Rosic, provision of a diffuser (device) may be omitted, and the diffuser area may be represented with an essentially vaneless portion of the duct (a so-called vaneless space) located downstream of the rotor and configured, in terms of its geometry and/or dimensional parameters, to diffuse a high-speed fluid flow arriving from the rotor.

Provision of the vaneless portion of the duct is common for all configurations of the rotary apparatus 100 described above. Depending on configuration, the vaneless portion (vaneless space) is arranged downstream of the rotor blades (rf. U.S. Pat. No. 10,744,480 to Xu and Rosic) or downstream of the diffuser vane cascade (rf. U.S. Pat. No. 9,494,038 to Bushuev and U.S. Pat. No. 9,234,140 to Seppälä et al). In some configuration described for example by Seppälä et al, arrangement of rotating and stationary blade rows in the internal passageway within the casing is such that vaneless portion(s) is/are created between an exit from the stationary diffuser vanes disposed downstream of the rotor blades and an entrance to the stationary guide blades disposed upstream of the rotor blades of a subsequent rotor blade cascade unit.

The terms "upstream" and "downstream" refer hereby to spatial and/or functional arrangement of structural parts or components with relation to a predetermined part- or component, hereby, the rotor, in a direction of fluidic flow stream throughout the apparatus (from inlet to exit).

Overall, the rotor with the working blade cascade can be positioned between the rows of stationary (stator) vanes arranged into essentially annular assemblies (referred to as cascades) at one or both sides of the working blade row. Configurations including two or more rows of rotor blades/rotor blade cascades arranged in series (in sequence) on/along the rotor shaft may be conceived with or without stationary blades in between. In an absence of stationary vanes between the rotor blade rows, the speed of fluidic medium propagating through the duct increases in each subsequent row. In such an event, a plurality of stationary vanes may be arranged into assemblies upstream of a first rotor blade cascade in said sequence (as stationary guide vanes) and downstream of a lastmost rotor blade cascade (as stationary diffuser vanes).

The row of rotor blades (rotor blade cascade) and a portion of the duct downstream of said rotor blades enclosed inside the casing optionally provided with an assembly of stationary diffuser vanes (diffuser area) may be viewed as a minimal process stage (hereafter, the stage), configured to mediate a complete energy conversion cycle. Hence, an amount of kinetic energy added to the stream of fluidic medium by at least one row of rotating blades is sufficient to raise the temperature of the fluidic medium to a predetermined value when said stream of fluidic medium exits the rotor blades and propagates, in the duct, towards a subsequent row of rotor blades, or enters the same row of rotor blades following an essentially helical trajectory formed within the essentially toroidal-shaped casing. The duct (which encloses the periphery of the rotor) is preferably shaped such, that upon propagation of the fluidic stream in the duct, the stream decelerates and dissipates kinetic energy into an internal energy of the fluidic medium, and an amount of thermal energy is added to the stream of fluidic medium.

The stationary guide blade row(s) disposed upstream of the at least one row of rotor blades prepare required flow conditions at the entrance of the rotating blade row (cascade) during the energy conversion cycle.

In some configurations, the process stage is established with the assembly of stationary guide vanes (upstream of the rotor blades), the row of rotor blades and the diffuser area arranged downstream of said rotor blades, the diffuser area provided as the essentially vaneless portion of the duct optionally supplied with diffuser vanes. During the energy conversion cycle, enabled with successive propagation of the stream of fluidic medium through the stationary guide vanes, the at least one row of rotor blades and the diffuser area, respectively, in a controlled manner, mechanical energy of the rotor shaft is converted into kinetic energy and further—into internal energy of the fluid, followed by the rise of fluid temperature. An amount of kinetic energy added to the stream of fluidic medium by rotating blades of the rotor is sufficient to raise the temperature of the fluidic medium to a predetermined value when said stream of fluidic medium exits the rotor blades and passes, inside the duct, through the diffuser area, whereupon the stream decelerates and dissipates kinetic energy into an internal energy of the fluidic medium, and an amount of thermal energy is added to the stream of fluidic medium. In the rotor blade row, the flow accelerates, and mechanical energy of the shaft and rotating blades is transferred to fluidic stream. In at least part of each rotor blade row the flow may reach a supersonic flow condition. In the diffuser area, the high-speed fluid flow arriving from the rotor is diffused with the significant entropy increase, whereby the flow dissipates kinetic energy into the internal energy of the fluidic substance, thus providing thermal energy into the fluid. If the flow upstream of the diffuser is supersonic, the kinetic energy of the fluidic stream is converted into internal energy of the fluid through a system of multiple shocks and viscous mixing and dissipation. An increase in the internal energy of the fluid results in a rise of fluid temperature. The energy conversion function may be performed by the vaneless portion of the duct located downstream of the rotor blades (rf. U.S. Pat. No. 10,744,480 to Xu & Rosic) and/or by an assembly of diffusing vanes, for example (rf. U.S. Pat. No. 9,234,140 to Seppälä et al).

The rotary apparatus 100 can be configured as a multi-stage- or a single-stage solution. Multistage configurations can be conceived comprising a number of rotor units (e.g. 1-5 rows of rotor blades sequentially arranged on/along the rotor shaft) alternating with common diffuser area(s) (vaneless or vaned).

In an exemplary configuration outlined in U.S. Pat. No. 9,234,140 to Seppälä et al, the rotary apparatus 100 can be implemented substantially in a shape of a ring torus, where a cross-section of the duct in the meridian plane forms a ring-shaped profile. The apparatus comprises a rotor unit disposed between stationary guide vanes (nozzle vanes), and stationary diffusing vanes. The stages are formed with rows of stationary nozzle vanes, rotor blades and diffusing vanes, through which the fluidic stream propagates, in a successive manner, following a flow path established in accordance with an essentially helical trajectory. In this configuration, fluidic stream circulates through the rotating rotor blade cascade a number of times while propagating inside the apparatus between the inlet and the exit. Similar ring-shaped configuration is described in U.S. Pat. No. 9,494,038 to Bushuev.

In another exemplary configuration outlined in U.S. Pat. No. 9,234,140 to Seppälä et al, the rotary apparatus 100 can be configured as an essentially tubular, axial-type turbomachine. In such configuration, the apparatus comprises an extended (elongated) rotor hub, along which a plurality of rotor blades is arranged into a number of sequential rows. The rotor is enclosed within the casing, inner surface of which is provided with the stationary (stator) vanes and diffuser vanes, arranged such that blades/vanes of the stator, rotor- and diffuser cascades alternate along the rotor hub in a longitudinal direction (along the length of the rotor shaft, for inlet to exit). Blades of the rotor cascade at certain position along the rotor in the longitudinal direction form the stage with the adjacent pairs of stationary guide (nozzle) vanes and diffusing vanes, respectively.

In described configurations, the subsequent stages have blade/vane-free space between them.

In still another exemplary configuration outlined in U.S. Pat. No. 10,744,480 to Xu and Rosic, the rotary apparatus 100 can be configured as a radial turbomachine that generally follows a design for centrifugal compressors or centrifugal pumps. The term "centrifugal" implies that fluid flow within the device is radial; therefore, the apparatus may be referred, in the present disclosure, as a "radial-flow apparatus. The apparatus comprises a number of rotor units mounted onto elongated shaft, wherein each rotor unit is preceded with stationary guide vanes. A vaneless portion of the duct shaped in a manner enabling energy conversion (U-bend or S-bend, for example) is located after the rotor unit(s). Additionally, configuration may comprise a separate diffuser device (vaned or vaneless) disposed downstream of the rotor.

In all configurations described above, the rotary apparatus 100 performs, in the method disclosed herein, in similar manner. In operation, the amount of input energy conducted into the at least one rotary apparatus integrated into the heat-consuming process facility is converted into mechanical energy of the rotor. Conditions in the rotary apparatus are adjusted such, as to produce flow rate conditions, at which an amount of kinetic energy added to the stream of fluidic medium by rotating blades of the rotor is sufficient to raise the temperature of the fluidic medium to a predetermined value when said stream of fluidic medium exits the at least one row rotor blades and passes through the duct and/or through the diffuser area to enter the subsequent row of rotor blades or the same row of rotor blades in accordance to the description above. The row(s) of rotor blades may be preceded with stationary guide vanes. Hence, the adjustable condition comprises adjusting at least a flow of fluidic medium propagating inside the casing of the rotary apparatus, between the inlet and the exit. Adjusting the flow may include adjusting such apparatus operation related parameters, as temperature, mass flow rate, pressure, etc. Additionally or alternatively, flow conditions can be adjusted by modifying shape of the duct formed inside the casing.

In some exemplary configurations, the rotary apparatus can be configured to implement a fluidic flow between its inlet(s) and outlet(s) along a flow path established in accordance with any one of: an essentially helical trajectory formed within an essentially toroidal-shaped casing, as discussed in any one of the patent documents U.S. Pat. No. 9,494,038 to Bushuev and U.S. Pat. No. 9,234,140 to Seppälä et al; an essentially helical trajectory formed within an essentially tubular casing, as discussed in the patent document U.S. Pat. No. 9,234,140 to Seppälä et al; an essentially radial trajectory as discussed in the patent document U.S. Pat. No. 10,744,480 to Xu & Rosic; and along the flow path established by virtue of the stream of fluidic medium in the form of two spirals rolled up into vortex rings of right and left directions, as discussed in the patent document U.S. Pat. No. 7,232,937 to Bushuev). The aerodynamic design of the rotary apparatus can vary.

The rotary apparatus utilizes a drive engine. In preferred embodiments, the apparatus utilizes electrical energy as the input energy and is therefore electric motor-driven. For the purposes of the present disclosure, any appropriate type of electric motor (i.e. a device capable of transferring energy from an electrical source to a mechanical load) can be utilized. Suitable coupling(s) arranged between a motor drive shaft and the rotor shaft, as well as various appliances, such as power converters, controllers and the like, are not described herewith. Additionally, the apparatus can be directly driven by gas- or steam turbine, for example, or any other appropriate drive device. In layouts involving parallel connection of a number of rotary apparatuses 100 to a common heat-consuming unit 101, such as a furnace, for example, one or more of said apparatuses may utilize different type of drive engine, e.g. the electric motor driven apparatuses can be combined with those driven by steam turbine, gas turbine and/or gas engine.

Electric power (defined as the rate of energy transfer per unit time) can be supplied into the rotary apparatus through supplying electric current to the electric motor used to propel a rotary shaft of the apparatus. Supply of electric power into the rotary apparatus can be implemented from an external source or sources (as related to the rotary heater unit/the apparatus 100 and/or the heat-consuming process facility 1000). Additionally or alternatively, electrical energy can be produced internally, within the facility 1000.

An external source or sources include a variety of supporting facilities rendered for sustainable energy production. Thus, electric power can be supplied from an electricity generating system that exploits at least one source of renewable energy or a combination of the electricity generating systems exploiting different sources of renewable energy. External sources of renewable energy can be provided as solar, wind- and/or hydropower. Thus, electric power may be received into the process from at least one of the following units: a photovoltaic electricity generating system, a wind-powered electricity generating system, and a hydroelectric power system. In some exemplary instances, a nuclear power plant may be provided as the external source of electrical power. Nuclear power plants are generally regarded as emission-free. The term "nuclear power plant" should be interpreted as using traditional nuclear power and, additionally or alternatively, fusion power.

Electricity can be supplied from a power plant that utilizes a turbine as a kinetic energy source to drive electricity generators. In some instances, electric power to drive the at least one apparatus 100 can be supplied from at least one gas turbine (GT) provided as a separate installation or within a cogeneration facility and/or a combined cycle power facility, for example. Electric power can thus be supplied from at least one of the following units: a combined cycle power facility, such as a combined cycle gas turbine plant (CCGT), and/or a cogeneration facility configured for electricity production combined with heat recovery and utilization through combined heat and power (CHP), for example. In some examples, the CHP plant can be a biomass fired plant to increase the share of renewable energy in the process described. Additionally or alternatively, supply of electric power can be realized from a spark ignition engine, such as a gas engine, for example, and/or a compression engine, such as a diesel engine, for example, optionally provided as a part of an engine power plant. Still further, any conventional power plant configured to produce electrical energy from fossil raw materials, such as coal, oil, natural gas, gasoline, and the like, typically mediated with the use of steam turbines, can be used to generate electrical energy as an input energy for the rotary apparatus 100. Also hydrogen can be utilized as a source of renewable energy, to be reconverted into electricity, for example, using fuel cells.

Any combination of the abovementioned sources of electric power, realized as external and internal sources, may be conceived. Importing low emission electric power from an alternative (external) source improves energy efficiency of the heat-consuming process facility.

Conducting input energy, comprising electrical power, into a drive engine of the rotary apparatus can be further accompanied with conducting mechanical shaft power thereto from a power turbine, for example, optionally utilizing thermal energy generated elsewhere in the facility 1000 or outside said facility. Shaft power is defined as mechanical power transmitted from one rotating element to another and calculated as a sum of the torque and the speed of rotation of the shaft. Mechanical power is defined, in turn, as an amount of work or energy per unit time (measured in Watt).

In practice, the shaft power from the electric motor and the power turbine, for example, can be divided so that any one of those can provide the full shaft power or a fraction of it.

FIGS. 2A-2D show exemplary layouts for the rotary apparatus 100 representing the rotary heater unit or units within the facility 1000 with regard to preheater unit 102, temperature booster section 103, and heat recovery unit 104. The following citations are used for the members: 100, 100A, 100B—Rotary heater unit(s) (rotary apparatus(es)); 101—Heat-consuming unit/process; 102—Preheater unit; 103—Additional heating apparatus (booster heater).

Figure 2A:
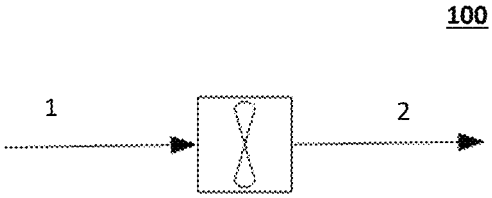
FIGS. 2A-2F are exemplary layouts of arranging rotary apparatus(es) 100 within the steel production facility, according to the embodiments.
Figure 3A:
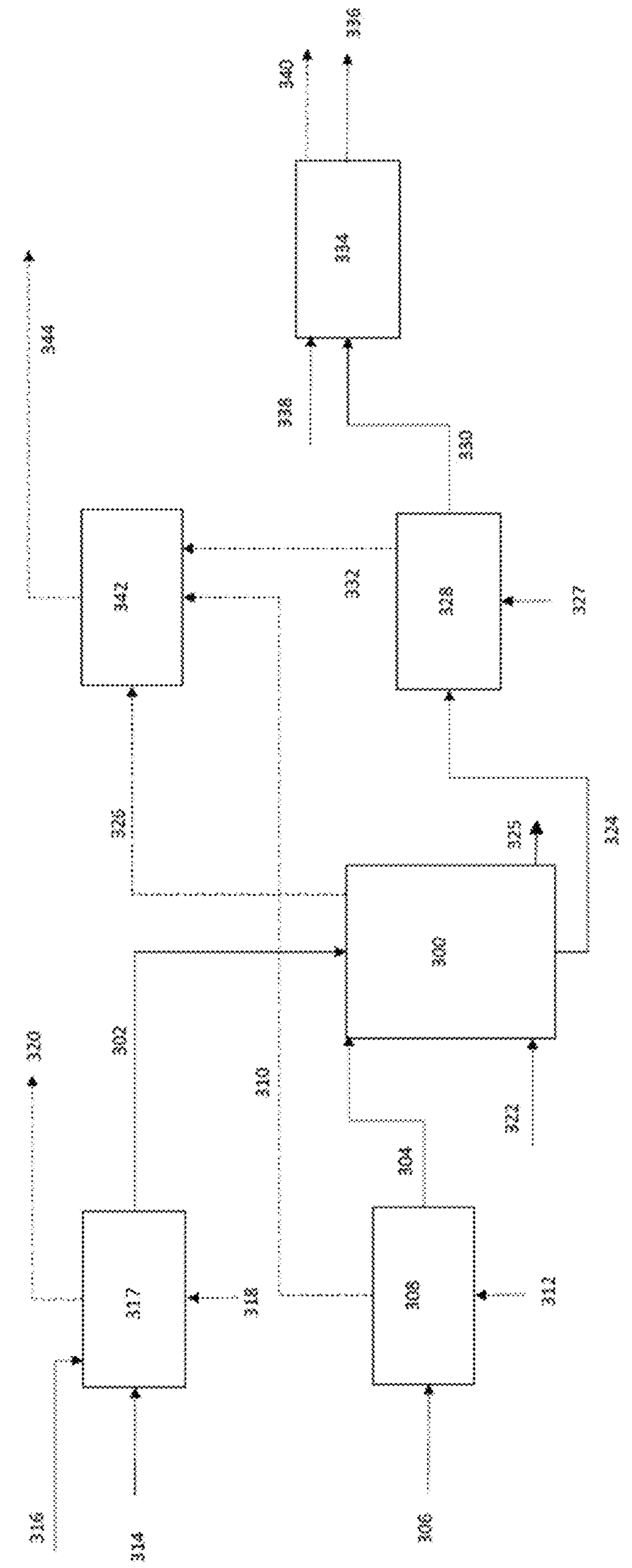
FIGS. 3A-3H are schematic representations of facilities and method(s) according to the embodiments.

FIG. 2A schematically illustrates a basic implementation for the rotary apparatus 100 configured to input heat into a stream of fluidic medium (feed stream 1) directed therethrough. Heated stream exiting the apparatus 100 is designated with reference number 2, respectively. In basic implementation, the rotor system of the rotary apparatus 100 is aerodynamically configured so that a volume of fluid is heated to a predetermined temperature while propagating along the flow path formed in the casing of the apparatus 100, between inlet and exit (so called "one-pass" implementation). The apparatus 100 enables temperature rise (delta T, ΔT) within a range of about 10° C. to about 120° C., in some configurations—up to about 500° C., in one stage. Hence, in case of a multistage implementation, the fluid can be heated to 1000° C. in "one-pass" implementation (taken 100° C. temperature rise per stage in a 10-stage apparatus). Since residence time the fluidic medium spends to pass through the apparatus stage is in scale of fractions of seconds, such as about 0.01-1.0 milliseconds, fast and efficient heating can be achieved already in the basic configuration. Temperature rise can be optimized as required.

Figure 2B:
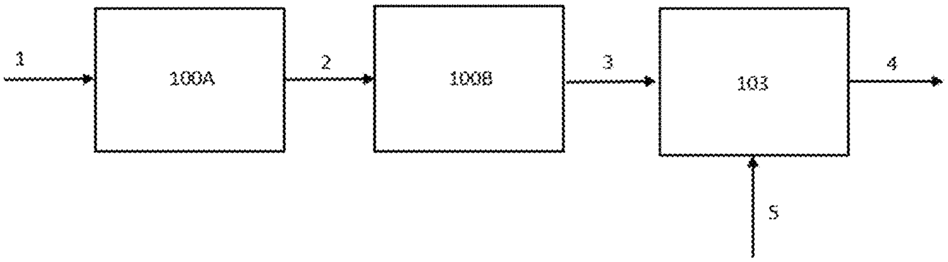

FIG. 2B illustrates a basic concept involving so-called booster heating. Booster heating is an optional method to heat a fluidic medium, such as a process gas, for example, beyond capability of a standalone heater apparatus 100.

Temperature boost may be viewed as thermal, chemical or both. In a first configuration (a) also referred to as a "thermal boost", an additional rotary heater apparatus (designated as 100B on FIGS. 2B, 2C and 2D) is arranged downstream of a "primary" rotary heater apparatus (designated as 100A on FIGS. 2B, 2C and 2D). Apparatuses 100A, 100B are generally recognized, within the present disclosure, as rotary heater units 100. Generation of the heated fluidic medium is can thus be achieved by provision of at least two sequentially connected rotary apparatuses 100A, 100B, wherein the stream of fluidic medium (rf. feed stream 1) is heated to a predetermined temperature in at least a first rotary apparatus (100A) in a sequence, referred to hereby as a primary heater, and wherein said stream of fluidic medium (rf. stream 2) is further heated in at least a second rotary apparatus (100B) in the sequence by inputting an additional amount of thermal energy into the stream of fluidic medium "preheated" in the first rotary apparatus 100A and propagating through the second rotary apparatus 100B (rf. stream 3). The apparatus 100B is therefore referred to as a booster heater. The apparatuses 100A, 100B may be identical and vary in terms of size or internal design. A sequence of two or more booster apparatuses such as 100B can be arranged after a primary heater 100A. Booster apparatuses can be arranged in parallel or in series, or in any combination that allows for optimization of rotating speed and aerodynamics thereof.

In a second, additional or alternative, configuration (further referred to as "chemical boost"), the additional heating apparatus designated as 103 (FIGS. 1, 2B) is adapted to receive, into the stream of fluidic medium propagating therethrough, reactive components 5, such as for example combustible fuel, to provide heat by exothermic reactions prior to directing said stream of fluidic medium to the heat-consuming process 101 of steel manufacturing. In this configuration, temperature boosting can be achieved by virtue of introducing (e.g. by injecting) a reactive chemical or chemicals 5 into to the stream of fluidic medium directed through the additional heater unit/heating apparatus 103. It is noted that stream 5 of FIG. 2B corresponds to stream 8 shown on FIG. 1.

The reactive chemical-based booster heater unit 103 may be located after the thermal booster heater unit 100, 100B (FIG. 2B) or directly after the primary heater 100, 100A (FIG. 1). The reactive chemical (reactant) 5 may include combustion gases, such as hydrogen gas, hydrocarbons, ammonia, oxygen, air, other gas and/or any other appropriate reactive compound, optionally a catalyst. In the unit 103, by virtue of exothermic reactions, the fluidic stream can be heated to a level, which is typically not possible to achieve by a single rotary apparatus not involving chemical-mediated heating (rf. stream 4). For example, a fuel gas, such as hydrogen, can be introduced into an oxygen-containing process gas, such as air. At elevated temperatures, hydrogen and oxygen enter an exothermic reaction to produce water molecules (hydrogen combustion).

Fuel gas can be injected into the booster heater unit 103 through burners along with air (or enriched oxygen) to rise the temperature of gases. If heated gas contains flammable gases and it is possible to consume these gases for heating only air/or oxygen can be added. Process gases can contain $H_2$, $NH_3$, CO, fuel gases (methane, propane, etc.) which may be burned to generate heat. Other reactive gases can be injected to generate heat if feasible.

The additional heater 103 adapted for chemical boost may be configured as a piece of pipe or as a chamber where exothermic reactions take place, and/or it can comprise as at least one rotary apparatus 100 arranged to receive reactive compounds to accommodate exothermic reactions to produce additional heat energy. The booster section 103 can thus comprise at least one rotary apparatus 100. Optionally, the reactive chemicals can be injected directly to the heat consuming process 101 (not shown). Additionally or alternatively, the reactive chemical mediated boost can be implemented in a single apparatus 100, 103, modified accordingly.

In an arrangement involving booster heating, the temperature of the stream of fluidic medium preheated to a predetermined temperature in a first rotary apparatus (100A) can be further raised to a maximum limit in subsequent heater units (100B, 103). By way of example, the temperature of the stream of fluidic medium preheated to about 1700° C. in a primary heater (100A) can be further raised in subsequent heater units (100B, 103) up to 2500° C. and beyond.

Mentioned concepts can be used separately or in combination, so that the reactive chemical 5 can be introduced into any one of the apparatuses 100 connected in parallel or in series (in sequence). Provision of the booster heater(s) is optional.

In additional or alternative configurations, preheating and additional heating can be implemented in the same apparatus 100 (not shown). This can be achieved in multistage configurations, comprising a number of rotor units (e.g. 1-5 rows of rotor blades sequentially arranged on/along the rotor shaft) alternating with common diffuser area(s) (vaneless or vaned).

Additionally or alternatively, booster heating can be used for example in an event, when the temperature of the fluid once heated in the rotary apparatus(es) 100, needs to be raised again after it has transferred its heat to the heat-consuming process 101. Exemplary configuration comprising a number of rotary heater apparatuses 100 (100A, 100B and/or optionally 103) alternating with the heat-consuming units 101 is shown on FIG. 2E. Such configuration can be utilized in an event when the temperature drop occurs in each unit 101 and it needs to be raised again between the units 101. The arrangement of FIG. 2E may be beneficial for a series of successive catalytic endothermic reactors (representing hereby heat-consuming units 101), where the temperature drops reactor-wise and has to be increased again between the reactors. See also description to FIG. 3F, where section 406 designates a catalytic reactor or a series of catalytic reactors, depending on application.

Figure 2C:
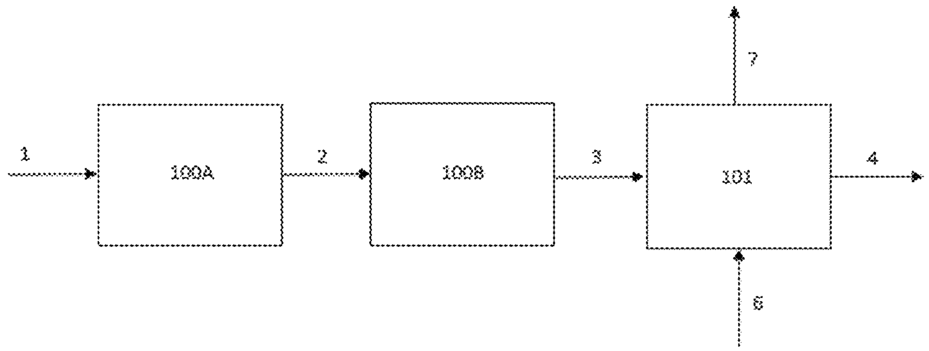
Figure 2D:
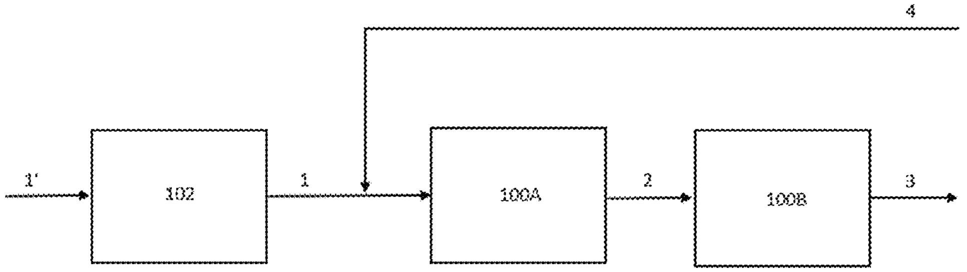
Figure 2E:
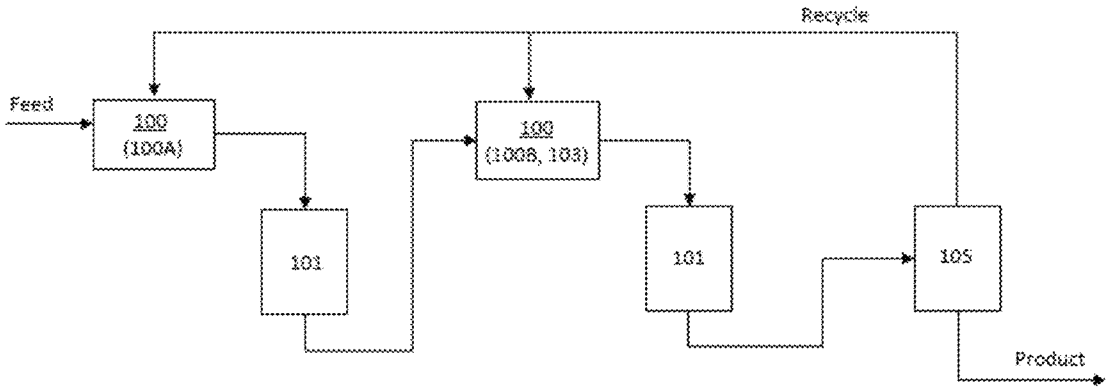

Upon connecting the at least two rotary apparatuses, such as 100A, 100B, and optionally 103 (in an event 103 is implemented as a rotary apparatus 100) in parallel or in series, a rotary apparatus assembly can be established (see for example FIGS. 2B-2D). Connection between the rotary apparatuses 100 implemented as "primary" heater(s) 100A or "booster" heater(s) 100B, 103 can be mechanical and/or functional. Functional (in terms of achievable heat input, for example) connection can be established upon association between at least two individual, physically integrated- or non-integrated individual apparatus units. In a latter case, association between the at least two rotary apparatuses can be established via a number of auxiliary installations (not shown). In some configurations, the assembly comprises the at least two apparatuses connected such, as to mirror each other, whereby said at least two apparatuses are at least functionally connected via their central (rotor) shafts. Such mirrored configuration can be further defined as having the at least two rotary apparatuses 100 mechanically connected in series (in a sequence), whereas functional connection can be viewed as connection in parallel (in arrays). In some instances, the aforesaid "mirrored" arrangement can be further modified to comprise at least two inlets and a common exhaust (discharge) module placed essentially in the center of the arrangement.

Rotary apparatuses (100A, 100B, 103, rf. FIG. 2B) can be assembled on the same (rotor) shaft. Each rotary apparatus can be optionally provided with a separate drive (a motor) which allows independent optimization of the apparatuses. When two or more separate rotary apparatuses are used, construction costs (materials etc.) can be optimized in view of operation temperature and pressure.

Additionally or alternatively, at least one rotary apparatus within the assembly can be designed to increase pressure of the fluidic stream. Hence, the at least one rotary apparatus in the assembly can be assigned with a combined heater and blower functionality.

Additionally or alternatively, a stream containing reactive or inert gases (such as stream 8 of FIG. 1) can be fed to the rotary apparatus 100 (not shown) or to any equipment downstream of said apparatus (e.g. into the heat-consuming process section 101). Thus, the reactive gases (such as stream 8 of FIG. 1) may be injected directly to the heat-consuming process unit 101, if the latter is configured to receive such chemicals. In manufacture of steel or steel pre-cursors, a support fuel (8) may be injected directly to the process unit 101, such as a furnace, to generate heat and/or to take part in the reactions. One example is reduction of iron ore by methane or hydrogen in a blast furnace (as discussed in more detail further below).

FIG. 2C illustrates the use of the rotary heater apparatuses 100A, optionally 100B with indirect process heating. The rotary apparatus 100 (100A, 100B) can be used for indirect heating of fluids in the heat-consuming unit 101, wherein heat is transferred between two non-mixing fluids as in heat exchanger-type configurations. Hence, fluids, such as gases or liquids, can be evaporated (vaporized) or superheated in a feasible heat exchanger arrangement 101 against fluid heated in the rotary apparatus 100. The heat-consuming unit 101 configured to accommodate a heat-consuming process can be represented with any (existing) fired heater, reactor or furnace, or any conventional heat exchanger device. Type of said "heat exchanger" configuration (101) can be selected as needed for optimal heat transfer. Heating gas (see streams 1-3) can be selected to be most suitable for heating and safety (for example: steam, $N_2$, air). Gas heated in the rotary apparatus 100A, 100B can be close to atmospheric pressure or pressure can be raised to improve heat transfer. Heat transfer medium 3 heated in the apparatus 100 (rf. stream 3 exiting 100B) is directed to the heat-consuming process 101, where heat is transferred from stream 3 to a "cold" process stream 6 to produce a "hot" process stream 7. Stream 4 designates the heat transfer medium outflow, respectively.

Process streams 6 and 7 of FIG. 2C thus correspond to streams 9 and 10 of FIG. 1, respectively (indirect heating configuration); while heat transfer medium streams 3 and 4 of FIG. 2C correspond to streams 3 (optionally 4) and 5, respectively (indirect heating configuration).

Figure 2F:
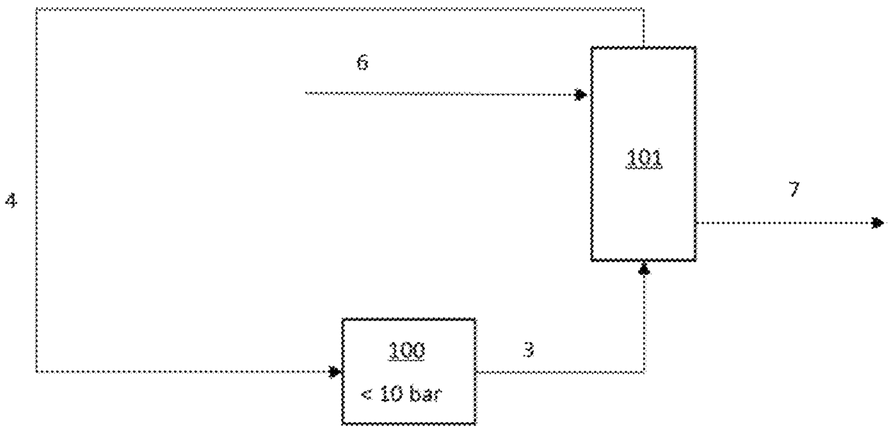

Another exemplary configuration layout for indirect heating of process fluids with the rotary apparatus 100 is presented on FIG. 2F. The heat-consuming unit 101 is set to act as a heat exchanger designed to heat the process stream inflow to a predetermined temperature by means of a stream of a heating medium (heat transfer medium) supplied from the rotary apparatus 100. Configuration of FIG. 2F may be applied to heating of gaseous media, such as hydrogen (gas) and/or a hydrogen-containing gas stream, in a heat exchanger 101 within the steel production facility. Same layout may be applied to raise the temperature of any other process stream flowing through the heat exchanger device (rf. FIG. 3G, for example).

Although heating of gaseous media can be implemented in the rotary apparatus 100 by simply using the steam as a heating fluid (not shown), in such cases where the pressure of a gaseous process fluid stream is elevated to above 10 bar for example or where the temperature of said gaseous process fluid stream becomes very high, for example up to above 1000° C., it is beneficial to apply the indirect heating concept shown on FIG. 2F. Designing the rotary apparatus to operate at high pressures and/or at high temperatures increases its material requirements and may complicate its technical solutions, which increase the cost of the apparatus. However, designing the apparatus for a low-pressure heating of inert gases such as air, nitrogen, carbon dioxide or steam and using the heated gas to heat hydrogen or other process stream in the process unit 101 (in a heat exchanger configuration) can result in a lower overall cost of the heating system.

In FIG. 2F, the rotary apparatus 100 is used to heat non-working fluids (e.g. inert fluids) such as air, (water) steam, carbon dioxide or nitrogen gas ($N_2$) at low pressure, for example, at pressure below 10 bar. Such non-working fluid is further referred to as a "heat transfer medium". Inflow stream 4 entering the apparatus 100 (heat transfer medium, cold) has a temperature of about 200-1100° C.; and outflow stream 3 exiting 100 (heat transfer medium, hot) has a temperature of about 800-1200° C., respectively. In turn, the temperature of "cold" process fluid 6 (for example, hydrogen) entering the heat-consuming unit 101 is about 20-500° C., while the temperature of "hot" process fluid outflow 7 exiting 101 is about 700-1000° C. In order to allow heat transfer from the heat transfer fluid into the process steam, the temperature of the heated fluid discharged from the rotary apparatus 100 must exceed the target temperature of the heated process fluid.

"Hot" heat-transfer fluid 3 discharged from the rotary apparatus 100 is led into the heat-consuming unit 101 provided, in the layout of FIG. 2F, as a heat exchanger that allows transfer of thermal energy from the heat transfer medium (inert fluid heated in 100) to the process fluid through a heat transfer surface, resulting in heating the hydrogen stream. As the heat transfer medium donates its heat to the process stream, it cools down. Cooled heat transfer medium 4 can be reintroduced into the rotary heater 100 to improve thermal efficiency of the system.

The heat exchanger 101 materials are selected to withstand high temperature hydrogen atmosphere, and/or elevated pressures; however, for stationary equipment like heat exchangers this is still more cost-efficient option than for the rotary apparatus 100.

Using the rotary apparatus 100 allows for optimization of temperature difference in heat exchanger configurations (represented hereby by the heat-consuming units 101), whereby the size of the unit 101 (configured as a heat exchanger, a reactor, a furnace, a heater, etc.) and possible unwanted reactions (fouling, coking) occurring on its surfaces due too high surface temperature can be minimized. High surface temperatures may cause excess fouling in process heaters. Indirect heating can be used for example to replace process heaters in various applications related to production of steel.

FIG. 2D illustrates the rotary heater apparatus 100A with a preheater 102 and with a recycle process fluid (stream 4) recycled from the heat consuming process (not shown). Preheater can be electric, fired, combustion engine, gas turbine, etc. or it can be a heat exchanger for recovering excess heat from any high temperature flow in the process. Provision of the preheater 102 is optional. The concept can further include an optional booster heater 100B downstream of the apparatus 100A. Thermal or chemical booster heating may be utilized. Stream 1' designates a (feed) fluid sent to the preheater 102. Said fluid is further propagated through the rotary apparatuses 100A, 100B, where the feed is heated and sent to the heat-consuming process at stream 3.

Any one of the rotary apparatuses 100A, 100B can be equipped with a fluid recycle arrangement (see stream 4, FIG. 2D). Any combination of the rotary apparatuses the fluid recycle arrangement can be conceived. Recycling is made possible through recirculation of the streams of fluidic medium by the at least one rotary apparatus.

In some configurations, the rotary apparatus 100 can utilize flue gases with low oxygen content exhausted from a conventional fired heater. In such an event, hot flue gases exhausted from the fired heater are mixed with recycle gases (stream 4, FIG. 2D) to be used for heating in the rotary heater 100, 100A. Oxygen content in the flue gases used in described case is preferably below a flammability limit to provide safe heating.

The following description pertains to FIG. 3A, which illustrates an overview of a steel production process 3000 carried out in a corresponding steel production facility. In the process/facility 3000, a blast furnace 300 operates with feedstock in the form of iron ore sinter 302 and coke 304. Both are solid materials that are fed into furnace, typically through an opening in the top of the furnace. Both raw materials need preparatory processes to optimise their utilisation in the blast furnace.

Coke is generated from coal 306 in a coking process 308. During coking, coal 306 is heated in the absence of oxygen to 1000-1250° C. for about 18 hours to remove volatile impurities like heavy aromatic hydrocarbons, sulphur and ammonia. These volatiles are vented to what is known as coke plant off-gas (COG) 310 that is also rich in CO, $CO_2$ and hydrogen. The high temperatures necessary for coking is typically achieved by burning fossil fuels 312.

Iron ore sinter 302 is made in a sintering plant 317 from iron ore 314 in a sintering process (317). In a typical sintering process, crushed iron ore 314 is transported with a conveyor belt. Fine coke powder 316 is mixed with the iron ore 314 to provide fuel for heating. The mixture of iron ore 314 and coke 316 is set on fire using burners configured to burn natural gas 318, and the off gases 320 from burning this mixture are evacuated from below the conveyor belt, thus providing even heat distribution throughout the material layer on the belt. The solid product, clean iron ore sinter 302, is crushed, cooled and sized after sintering to make feedstock for the blast furnace 300.

In the blast furnace 300, coke 304 and iron ore sinter 302 are fed into the furnace together with limestone, and hot air or oxygen (1000-1200° C.) 322 (the latter is typically fed into the furnace from the bottom). The hot air 322 reacts with the coke 304 and pulverised coal and forms a reduction gas that abstracts the oxygen from the iron ore 302. At the same time, heat is created which is required when melting the reduced iron ore. Limestone is added to help with removal of sand silicates in form of 'slag'. The products from the blast furnace include molten product (molten metal iron) 324, slag 325 and blast furnace gas (BFG) 326 that is rich in CO and hydrogen.

After the blast furnace 300, the molten metal product 324 is mixed with pure oxygen 327 in a basic oxygen furnace 328, which removes carbon and other chemical impurities through the oxygen converter process, forming a steel product 330, typically in the form of steel sheets. The majority of carbon is removed as CO, making basic oxygen furnace gas (BOFG) 332 rich in CO and therefore rich in calorific value and carbon content. As the steel sheets 330 are cooled, they are typically sent to a post-processing unit 334, such as a hot strip mill for hot rolling the sheets 330 into coils 336 before shipping to customers. In hot rolling, the steel sheets 330 are heated to 1000-1270° C. by burning natural gas 338 on top of the sheets 330, producing a $CO_2$-rich off gas 340. Any impurities ('slag') is removed from the surface of the sheets 330 and sheets are milled to desired thickness, cooled down and rolled into coils 336 for shipment.

The main off-gases from steel making are coke plant off-gas (COG) 310, blast furnace gas (BFG) 326 and basic oxygen furnace gas (BOFG) 332. All of these gases are rich in nitrogen and $CO_2$, but they also contain components with heating value (hydrogen, CO and hydrocarbons) and are thus typically incinerated in a power plant 342 for energy, producing a $CO_2$-rich off gas 344. Recently, material valorisation of these off-gases has been extensively studied. The most promising pathways for material valorisation of these streams include reverse-water gas shift reaction and dry reforming, which both can be used together with a reducing chemical (hydrogen or methane) to convert $CO_2$ and hydrocarbons in the gas streams into synthesis gas-like mixture of CO and hydrogen. The synthesis gas (syngas) can be converted into base chemicals in numerous ways, most industrially relevant being methanol production and Fischer-Tropsch synthesis.

As used herein, "valorisation" refers to the economic analysis of waste material for reuse and recycling. Thus, as used herein, "valorisation" is synonymous with "recycling".

The following non-limiting examples illustrate the use of the rotary apparatus 100 in steel making.

Example 1: Provision of Heat for Coking Plant (FIG. 3B)

Figure 3B:
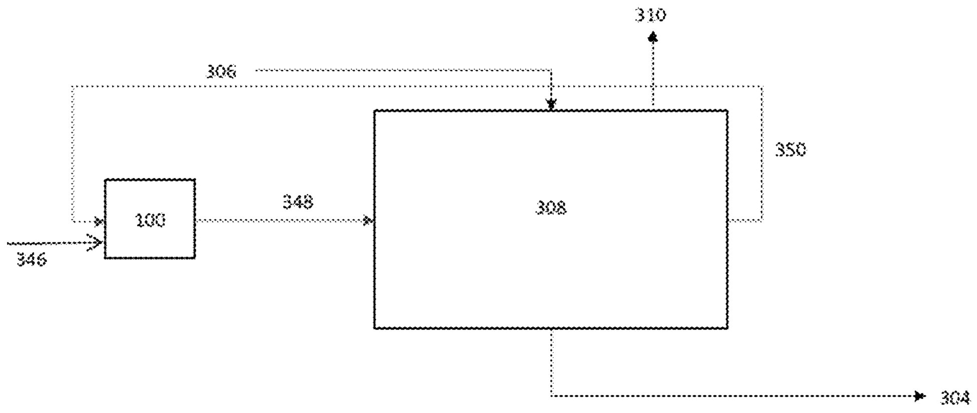

FIG. 3B is a block diagram for utilisation of the rotary apparatus 100 in a coking process 308.

Instead of heating the coal in a coke plant with fossil fuel fired heaters, the rotary apparatus 100 can be used to provide heat for the coking of coal. Heating can be done by circulating a gas 346 (air, nitrogen, steam) through the rotary apparatus 100 where it heats up to about 1300-1500° C. The heated gas 348 is then transferred to the coke oven 308 where the heated gas 348 releases part of its heat to coal 306. The coking process typically operates at around 1200° C. for about 18 hours. Exhaust gas 350 from the coke oven, which has cooled to a temperature low relative to the oven 308, but still on the order of around 500° C., can be recycled back to the rotary apparatus for optimal heat integration, as well as heat and energy recycling. Depending on the amount of exhaust gas 350 recycled from the oven 308 to the rotary apparatus 100, the amount of gas 346 necessary to maintain optimal flow and energy capacity may be reduced accordingly. Through recycling of exhaust gases 350, an amount of the off-gases 310 vented to the atmosphere can be minimized.

The coking process and related plant 308 correspond to the heat-consuming unit 101 described herein above.

Example 2: Provision of Heat for Sintering Plant (FIG. 3C)

Figure 3C:
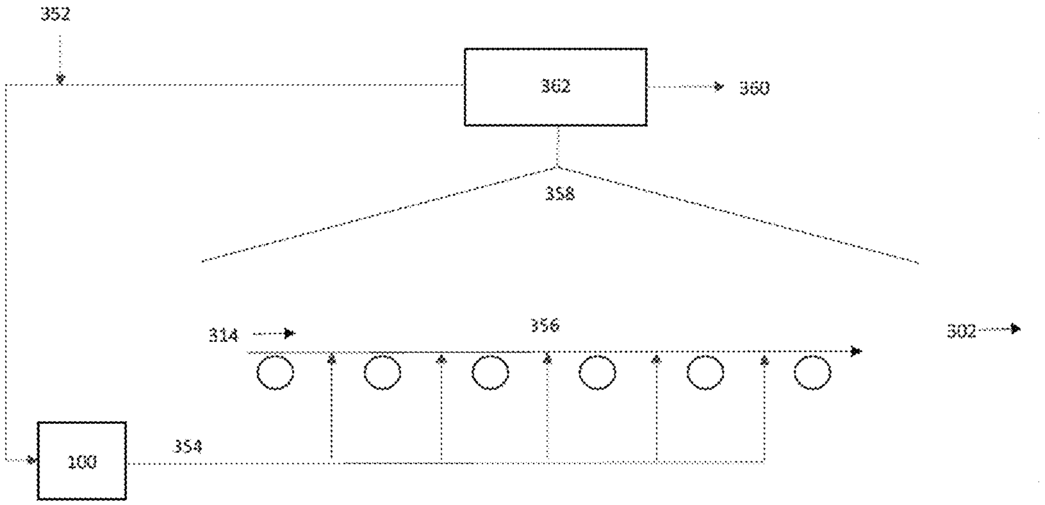

FIG. 3C is a block diagram for the rotary apparatus utilisation in sintering plant (rf. sintering plant 317 on FIG. 3A).

Instead of heating the crude iron ore in a sintering plant with fossil fuel fired heaters and coke, the rotary apparatus 100 can be used to provide heating for reducing iron oxide ore into iron ore sinter. Heating can be done by circulating a gas 352 (air, nitrogen, steam) through the rotary apparatus 100 where it heats up to temperature above about 1200° C. The heated gas 354 is then passed to the conveyor belt 356 where the reduction of iron oxide ore 314 into iron ore sinter 302 takes place. The conveyor belt can be perforated. Exhaust gas 358 from the conveyor belt 356 can be partly recycled back to the rotary apparatus 100 for optimal heat integration. Part of the recycled gas is purged as purge gas 360 (and replaced with fresh gas/a make-up gas 352 in a similar amount) using a gas splitter or scrubber 362 due to accumulation of impurities in the recycle. Alternatively, impurities from sintering process can be removed from the recycled gas to keep their concentration at acceptable level.

In some configurations, section 317 represents a pellet plant. The processes of sintering and pelletisation both perform essentially same function, that is, prepare iron ore material for being processes in a blast furnace. Iron ore sinter and pellets are both agglomerated forms of iron ore suitable for use as blast furnace burden materials.

The sintering/pelletising process and related sinter/pellet plant 317 correspond to the heat-consuming unit 101 described herein above.

Example 3: Heating Hot Blast Gas for Blast Furnace (FIG. 3D)

Figure 3D:
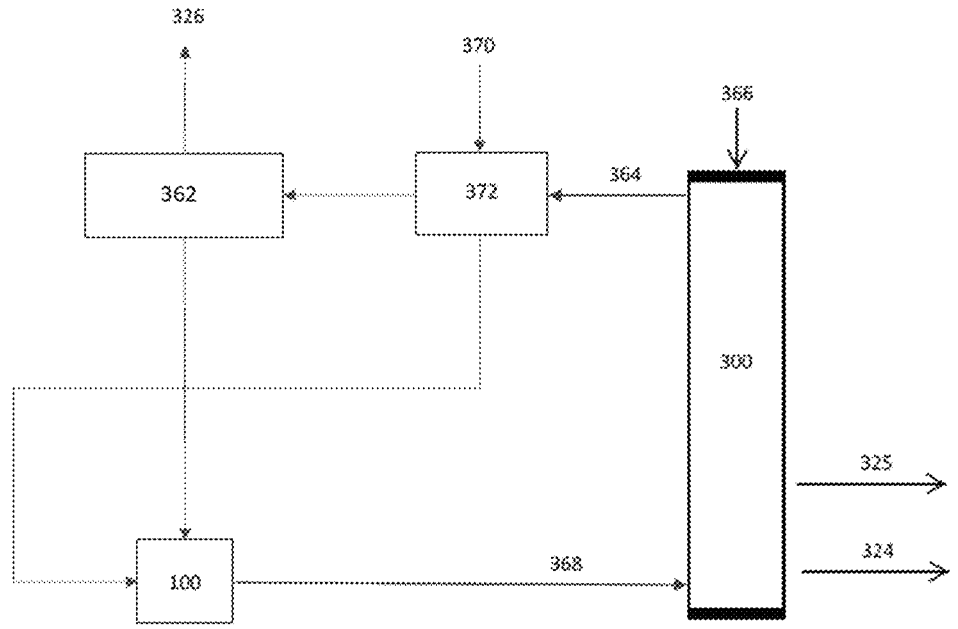

FIG. 3D is a block diagram for the rotary apparatus utilisation in blast furnace.

In the reduction of iron oxide into iron, the blast furnace 300 needs air or oxygen for converting coal into CO that acts as the reducing gas for converting iron ore into iron. Externally pre-heating this air or oxygen up to about 1200° C. is commonly practised to reduce the consumption of coke and the subsequent generation of $CO_2$ in the blast furnace 300. First, pre-heating of the air/oxygen or the 'hot blast' is done through capturing a part of the heat from blast furnace off-gas 364 and achieving the final temperature of about 1200° C. via heating provided from fossil fuels incineration. The rotary apparatus 100 can be used to provide the final heating step instead of fossil fuels (otherwise burned in the furnace 300). Additionally, the rotary apparatus 100 can be used to recycle a part of the blast furnace off-gases 364 back to blast furnace 300 for valorisation of the unreacted CO in the off-gas.

In this embodiment, blast furnace 300 accepts a feedstock 366 that includes iron ore sinter 302, coke 304 (rf. FIG. 3A), and limestone. Heated air or oxygen 368 is provided by the rotary apparatus 100. The iron ore sinter in the feedstock 366 is first reduced at around 700° C. in a reaction having the following formula:

$$3CO(g)+Fe_2O_3(s)\square 2Fe(l)+3CO_2(g)$$

Reaction 1: Reduction of Iron Ore

At around 800-850° C., carbon dioxide both in the supplied air 368 and as a result of Reaction 1 reacts with coke in the feedstock 366 in a reaction having the following formula:

$$CO_2(g)+C(s)\square 2CO(g)$$

Reaction 2: Carbon Dioxide Reaction with Coke

At around 850° C., limestone decomposes and forms slag ($CaSiO_3$) in a series of reactions having the following formulas:

$$CaCO_3(s)\square CaO(s)+CO_2(g)$$

$$CaO(s)+SiO_2(s)\square CaSiO_3(l)$$

Reaction 3: Limestone Decomposition

At around 1000° C., hot air reacts with coke in a reaction having the following formula:

$$C(s)+O_2(g)\square CO_2(g)$$

Reaction 4: Oxidation of Coke

In blast furnace 300, the molten iron 324 has the greatest density and is extracted from the bottom of the furnace. The molten slag 325 sits on top of the molten iron 324 and is extracted from a position above the molten iron 324.

Exhaust gas 364 exits the blast furnace 300 and is combined with fresh air 370 in a heat exchanger 372 in an amount necessary to supplant the air consumed in the blast furnace 300. Some of the exhaust gas 364 and fresh air 370 is transferred to rotary apparatus 100, while some is transferred to a gas splitter/scrubber 362 for capturing excess $CO_2$. The blast furnace gas (BFG) 326 is discharged from scrubber 362 and the remaining gas is recombined in rotary apparatus 100.

After the blast furnace 100, the molten metal product (molten iron 324) is mixed with pure oxygen in the basic oxygen furnace 328 (rf. FIGS. 3A, 3F). In the process, carbon and chemical impurities contained in the molten metal iron are oxidized, whereby impurities are removed, and the content of carbon is lowered. In the basic oxygen furnace 328, the molten iron is converted to low-carbon steel. Basic oxygen furnace gas (BOFG) 332 is discharged from the oxygen converter furnace 328 for further processing. In the layout of FIG. 3F, the BOFG 332 can be recycled, fully or partly, back to the rotary apparatus 100. Steel melt is further transported via ladles (not shown) to a post-processing unit 334.

The post-processing unit 334 can be configured for post-processing of a steel product via any one of: heat treatment, carburizing, casting and/or rolling. In the carburizing process, the steel product is upgraded with a source of carbon, such as carbon monoxide, for example, to make it harder. The unit 334 may include a casting unit, such as a continuous caster, for example, where steel sheets 330 are produced, and a rolling mill, such as a (continuous) hot strip mill for example, to where the cooled down steel sheets 330 can be sent for being rolled into coils 336 before shipping to customers. In some instances, at least the caster can be integrated with the oxygen converter 328 (rf. FIG. 3F). An example of installing the rotary apparatus 100 to the post-processing unit 334 is shown on FIG. 3E (Example 4).

The blast furnace 300 corresponds to the heat-consuming unit 101 described herein above.

Example 4: Heating Steel Sheets in Hot Rolling Process with the Rotary Apparatus (FIG. 3E)

Figure 3E:
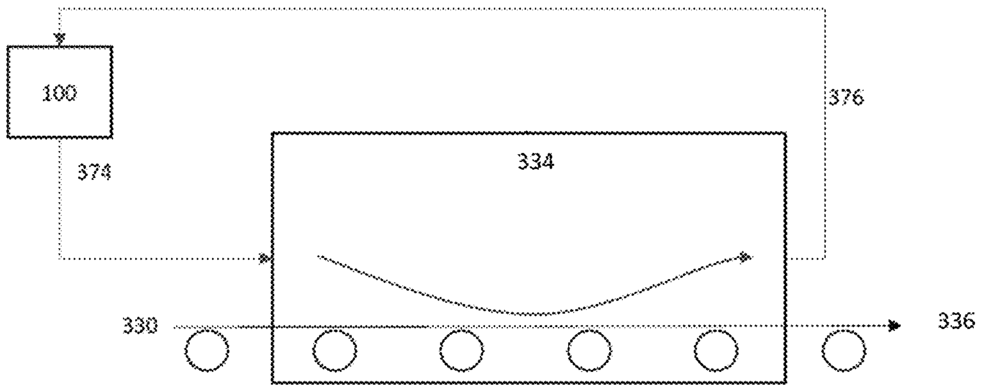
Figure 3F:
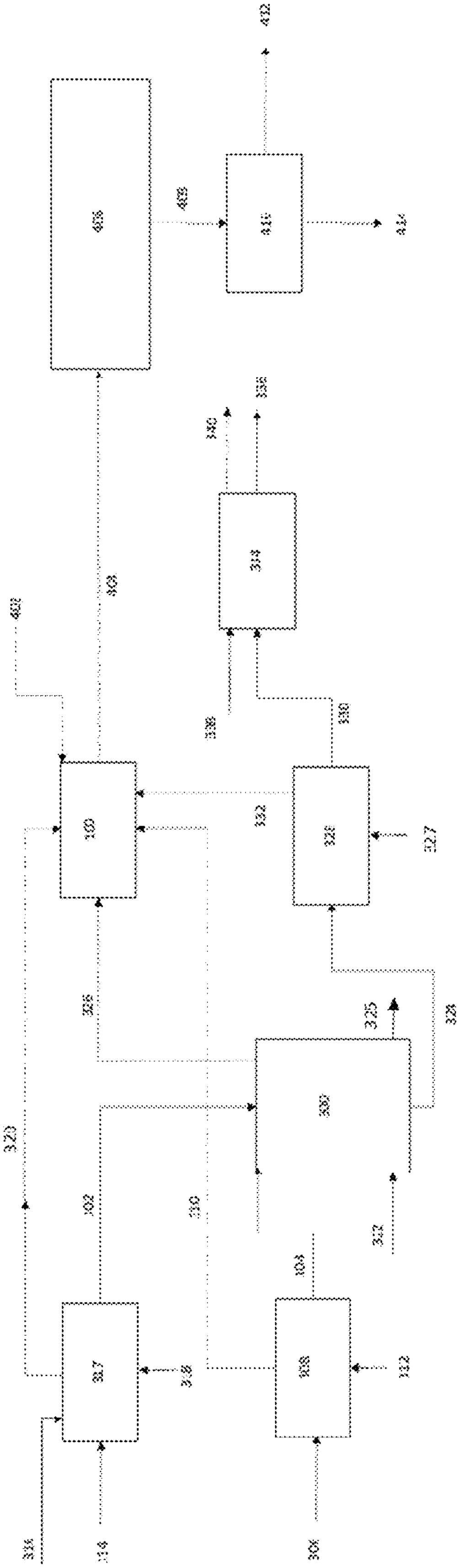
Figure 3G:
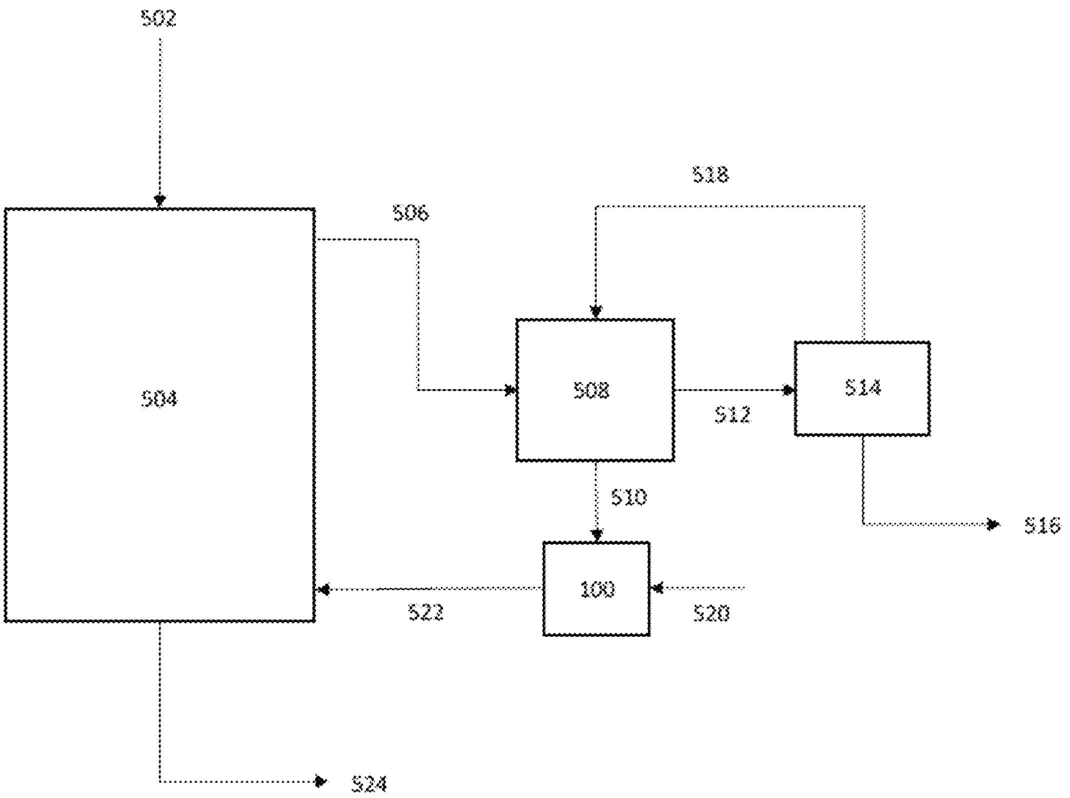

FIG. 3E is a block diagram for the rotary apparatus utilisation in hot rolling.

FIG. 3E illustrate integration of the rotary apparatus 100 into the post-processing unit 334 comprising at least a rolling mill. In hot rolling, the steel sheets are heated to the temperatures between about 1000-1270° C. to bring steel sheets 330 into a condition where they can be milled and rolled. Typically, the high temperature is achieved by burning natural gas (338, rf. FIGS. 3A, 3F) on top of the sheets 330 to heat them up. The rotary apparatus 100 can replace natural gas burners and provide hot gas 374 (nitrogen, air, steam) for heating the steel sheets 330 to required temperature. Recycling hot rolling off-gas 376 at least partly through the rotary apparatus can be done to minimise thermal losses during hot rolling.

The post-processing unit 334 corresponds to the heat-consuming unit 101 described herein above.

Example 5: Material Valorisation of Coke Plant, Basic Oxygen Furnace and Blast Furnace Off-Gases (FIG. 3F; Steel Production—Off-Gas Valorisation)

Coke plant, basic oxygen furnace and blast furnace off-gases are rich in calorific value and carbon. Hence, these streams can be valorised either materially or energetically. Energetic valorisation is a standard way of valorising the gases by incinerating them into energy in a power plant or equivalent. This, however, leads to $CO_2$ emissions and recent innovation activity has focused on material valorisation of these streams. Material valorisation of streams containing hydrogen and C1 chemicals is typically done by converting hydrocarbons and $CO_2$ in the off-gases into synthesis gas. Synthesis gas is a mixture of CO and hydrogen with varying proportions and is a raw material for some common base chemical reactions like methanol synthesis of Fischer-Tropsch synthesis. An even simpler way to valorise these gases is to manipulate their constituents (sometimes together with an external methane source) towards maximal CO and $H_2$ content. CO and $H_2$ can both act as reducing agents in the blast furnace and can therefore be recycled back to the blast furnace after removal of impurities.

Table 1 gives a typical composition of three main off-gas steams from steel making (source: Angewandte Chemie; Volume 60, Issue 21; May 17, 2021, Pages 11852-11857).

| Feed name | COG (310) | BFG (326) | BOFG (332) |
|---|---|---|---|
| $CH_4$ (vol %) | 22.0 | 0.0 | 0.0 |
| $C_xH_y$ (vol %) | 2.0 | 0.0 | 0.0 |
| $CO_2$ (vol %) | 1.2 | 21.6 | 20.0 |
| $H_2O$ (vol %) | 4.0 | 4.0 | 4.0 |
| $H_2$ (vol %) | 60.7 | 3.7 | 3.2 |
| CO (vol %) | 4.1 | 23.5 | 54.0 |
| $N_2$ (vol %) | 5.8 | 46.6 | 18.1 |
| Ar + $O_2$ (vol %) | 0.2 | 0.6 | 0.7 |

Adjusting the gas composition towards optimal CO/$H_2$ ratio required by selected application can be done using four generally known high temperature catalytic reactions:

$$CO+H_2O \rightleftharpoons CO_2+H_2$$

Reaction 5: Water-Gas Shift Reaction $$CO_2+H_2 \rightleftharpoons CO+H_2O$$

Reaction 6: Reverse Water Gas Shift Reaction $$CH_4=H_2O \rightleftharpoons CO+3H_2$$

Reaction 7: Reverse Water Gas Shift Reaction $$CO_2+CH_4 \rightleftharpoons 2H_2+2CO$$

Reaction 8: Methane "Dry" Reforming

As avoidance of $CO_2$ emissions is typically the target of such C1 chemistry manipulation, Reaction 5 (Water Gas Shift reaction, WGS) is not recommended as it produces $CO_2$. Instead, sustainable hydrogen from electrolysis or methane pyrolysis should be used to increase share of hydrogen in syngas mixtures.

Temperatures required by reverse water gas shift reaction, methane steam reforming or methane 'dry' reforming are typically between 800° C. and 1200° C., and such high temperatures are today achieved by incineration of fossil fuels. The rotary apparatus 100 is an electrified and emission-free technology to heat the off-gases to temperatures required by those catalytic reactions.

FIG. 3F illustrates application of the rotary apparatus 100 in high temperature catalytic reactors for adjusting CO/$H_2$ ratio and maximising content of syngas in steel mill off-gases. Numbering for the members is the same as FIG. 3A.

Each of the blast furnace 300, coking process 308, sintering plant/pellet plant 317, and basic oxygen furnace 328 produce off-gases which carry residual heat. In the embodiment depicted in FIG. 3F, these off-gases are redirected to rotary apparatus 100, which further heats these off-gases to temperatures necessary for the catalytic reactions described in Reactions 5-8. Make-up hydrogen and/or methane 402, typically from a renewable source, may be added to the rotary apparatus 100 to be heated, depending on the needs of the catalytic reactions in the next step.

The heated off-gases and make-up hydrogen/methane, 404, are then transported to a catalytic reactor 406 configured for the endothermic, high temperature reactions described in Reactions 5-8. Catalytic reactor 406 may be a series of reactors depending on the needs of the application. The series of reactors may be implemented as shown on FIG. 2E, where each unit 101 represents a catalytic reactor. The product 408 from the catalytic reactor 406, which is a product gas having the desired ratio between $H_2$ and CO, is transported to an apparatus 410 for cleaning or scrubbing for preparation for the end-use or for recycling. Apparatus 410 may have an inert gas (water steam, nitrogen gas, etc.) purge 412, and the end-product 414 is discharged from the apparatus 410. The end-product 414 may be recycled to the catalytic reactor for further reaction and higher yield, recycled to the blast furnace 300 for further iron ore reduction, sent to a methanol production process, or sent to a Fischer-Tropsch reaction, depending on the desired end-use.

FIG. 3F illustrates that the rotary apparatus(es) 100 can be used to collect the exhaust gases produced in the steel manufacturing facility 1000, 4000 (rf. streams 310 (COG), 320 (off-gases from sintering/pellet plant), 326 (BFG) and 332 (BOFG)). When hydrogen or methane is added along with stream 402, resulting gas mixture 404 can be used to produce synthesis gas in the endothermic catalytic reactor 406 in desired CO/$H_2$ ratio for further refining to produce fuels and chemicals (not shown).

With reference to FIG. 3F, any one of the: sintering/pellet plant 317, coking plant 308, blast furnace 300, basic oxygen furnace 328, steel post-processing unit 334, and reactor(s) 406, and/or any combination thereof correspond(s) to the heat-consuming unit 101 described herein above.

Example 6: Pre-Heating Hydrogen for Direct Hydrogen Reduction of Iron Ore (FIG. 3G)

A novel way to mitigate $CO_2$ emission from steel industry is to use hydrogen instead of coal as a reducing agent. Unlike coke reduction, hydrogen reduction is an endothermic reaction and requires additional heat input to heat hydrogen to reaction temperature and to maintain the reaction temperature. This additional heat input typically comes from excess hydrogen that is oxidised in the furnace, leading to significant increase in hydrogen consumption.

Application of the rotary apparatus 100 in iron ore reduction with hydrogen would supply this additional heat by heating the hydrogen to, or above, reduction temperature of about 900° C., while also recycling gaseous reaction products, mainly water and unreacted hydrogen, partially back to the reduction process for optimal heat recovery.

FIG. 3G illustrates application of the rotary apparatus 100 in a process of reduction of iron ore to iron with hydrogen (direct hydrogen reduction of iron ore to produce direct reduce iron (DRI) or sponge iron). Iron ore sinter/pellets 502 are supplied to a process unit 504 for steel production. The process unit 504 can be configured as a furnace, optionally a blast furnace, a kiln or a reactor. Hot unreacted hydrogen and water 506 is discharged at around 200° C. to a heat exchanger/economizer 508. Hot gas 510 is discharged from the heat exchanger 508 to the rotary apparatus 100. Liquid water 512 from the heat exchanger 508 is transferred to a water separator 514 that separates water 516 from unreacted hydrogen 518. This unreacted hydrogen 518 is passed to the heat exchanger 508. Hot gas 510 from the heat exchanger 508 that is passed to the rotary apparatus 100 is combined with make-up hydrogen 520, typically from a renewable source. The hot gas 510 and make-up hydrogen 520 are heated to around 1200° C. and is charged into the DRI furnace, kiln or reactor 504 in the form of hot gas stream 522. The hot gas stream 522 reacts with the iron ore sinter/pellets to produce sponge iron 524 suitable for forming into steel. FIGS. 3D and 3G hence illustrate main processes of iron ore reduction to iron, where the process of FIG. 3D produces molten iron in the blast furnace 300, while FIG. 3G illustrates is a process of direct reduction of iron ore to metal iron without melting it. Reduction occurs in the process unit 300 (blast furnace) or 504 (DRI furnace, kiln or reactor) (FIGS. 3D, 3G, respectively), which uses iron ore sinter/pellets 302 or 502 as a feedstock. Iron ore sinter/pellets (302, 502) are supplied into the furnace (300, 504) from the sintering plant or pellet plant 317, respectively.

The DRI process unit 504 corresponds to the heat-consuming unit 101 described herein above.

Figure 3H:
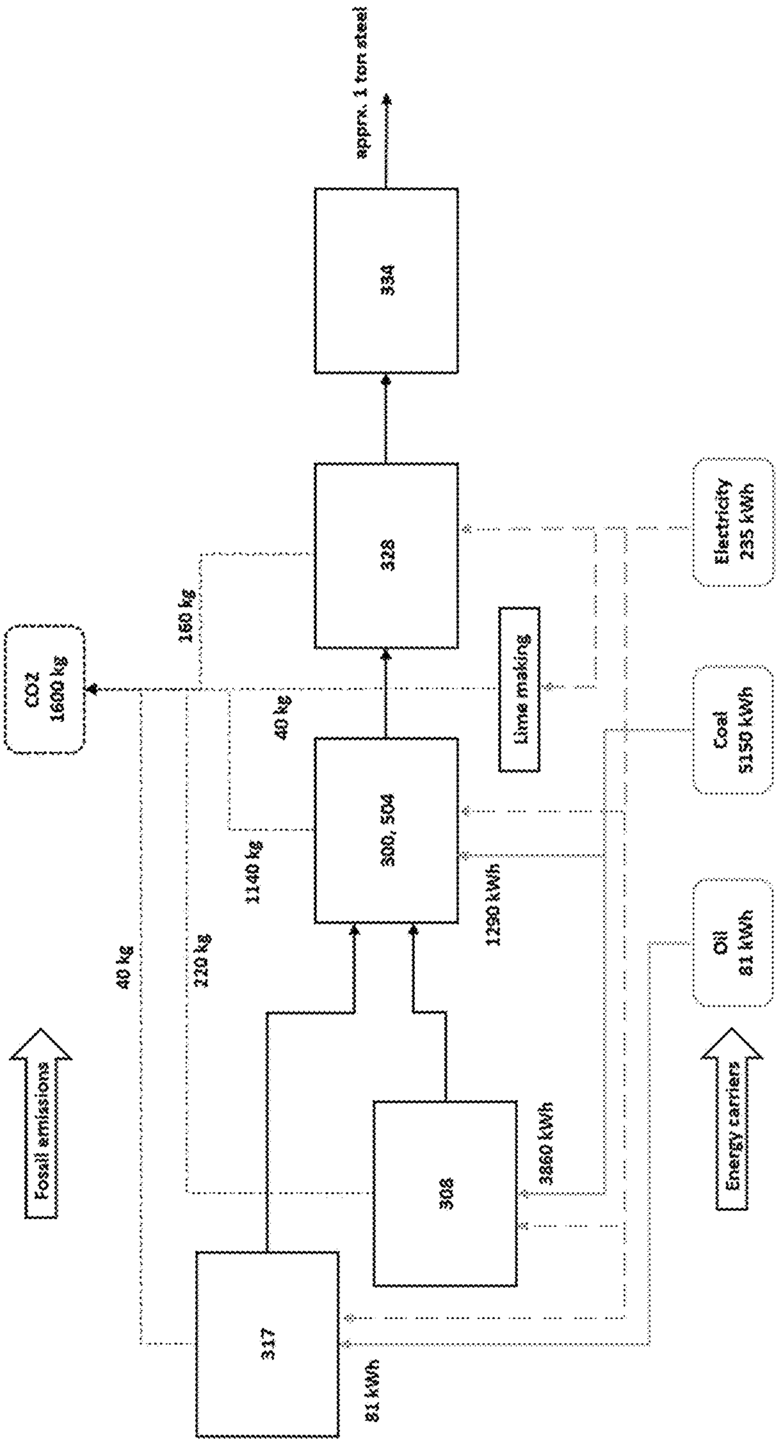

FIG. 3H is illustrates the ways of $CO_2$ emissions source distribution in traditional steel making. FIG. 3H, together with Examples 1-6 (FIGS. 3B-3G) demonstrates, that the rotary apparatus 100, when installed into the steel production facility to replace, fully or partly, oil- and coal-derived energy carriers, can assist is energy efficiency and $CO_2$ emission mitigation in all major steps of steel making. Should $CO_2$ emissions still arise, the rotary apparatus can be used to manipulate these emissions together with other off-gas components and external hydrogen/methane source for preparing these streams into material use. The rotary apparatus can be applied with a positive effect on emissions and energy efficiency in both conventional, coke-based iron ore reduction and novel, hydrogen-based reduction processes.

Example 7: Application of the Rotary Apparatus in a Kiln-Type Process Units for Pelletisation and Direct Reduction of Low-Quality Iron Ore into Direct Reduced Iron (DRI)

Example 7 supplements the previous Example 6. The rotary apparatus 100 can be used to produce a heated fluidic medium in the processes of direct reduction of iron ore to direct reduced iron carried out in a heat-consuming unit 101 configured as a process unit for reducing iron ore to metal iron without melting it. As mentioned above, the DRI process can be carried out in a furnace, in a kiln, or in a reactor, typically of a fluidized bed type using hydrogen gas or coke gas as reducing agents, where solids are contacted with hot reducing gas. Various types of kilns, such as rotary kilns or grate kilns, can be utilized.

An exemplary rotary kiln is a rotating horizontal vessel where rotation around the axis of the vessel provides mixing for the solids inside the kiln. Specially designed internals can be added to improve mixing of the solids and hot gas. A grate kiln is a type of kiln where the incoming solid raw material is first 'grated' to grind and size it to optimise its surface area for contacting with hot gas. In steel making, grate kilns can be used for pelletising low quality iron sources (lump ore, beach sand, ilmenite and iron ore fines) that will not convert to iron ore sinter in sintering plant. These pellets can be fed to the blast furnace as co-feed with iron ore sinter (see iron ore sinter/pellets 502 supplied into the DRI process unit 504, FIG. 3G).

Rotary kilns can be used for direct reduction of iron ore into iron by mixing the ore pellets with coke and contacting the solid mixture with hot air. Coke reacts with oxygen in the hot air to yield CO, which acts as a reducing agent for iron ore, converting it to iron and $CO_2$. Although the reaction scheme and the reactants are the same as in blast furnace (rf. FIG. 3D and Example 3), the rotary kiln allows use of iron ore with lower iron content and produces a solid iron product (direct reduced iron, DRI) for steel making.

Grate and rotary kilns are often used in combination—pellets produced in the grate kiln can be fed into the rotary kiln for direct reduction, or the rotary kiln can be part of a grate kiln system for improving the heat transfer between solids and hot gas.

The application of the rotary apparatus in rotary and grate kilns is straightforward and generally follows a route outlined in description to FIG. 3D (Example 3): a typical way of introducing hot gas into a kiln is firing natural gas from the hot end of the kiln. Instead of firing natural gas, high temperature air from the rotary apparatus of the present invention at 1200-1700° C. can be fed to the hot end of the kiln to provide necessary heating.

Alternatively, in some applications the gas heated in the rotary apparatus 100 can be hydrogen, in which case the use of coke (and associated $CO_2$ emissions) is not necessary as hot hydrogen can act as a reducing agent for iron ore. Unreacted hydrogen and water produced in hydrogen reduction reaction can be separated after the kiln and hydrogen recycled back to the kiln through the rotary apparatus, further improving the recycling of both energy and materials. Direct reduction of iron ore with hydrogen is described with regard to FIG. 3G.

It is clear to a person skilled in the art that with the advancement of technology the basic ideas of the present invention may be implemented and combined in various ways. The invention and its embodiments are thus not limited to the examples described herein above, instead they may generally vary within the scope of the appended claims.

The invention claimed is:

1. A method for steel production, the method comprising generation of a heated fluidic medium by at least one rotary apparatus integrated into a steel production facility, the at least one rotary apparatus comprising:
- a casing with at least one inlet and at least one exit,
- a rotor comprising at least one row of rotor blades arranged over a circumference of a rotor hub mounted onto a rotor shaft, and
- a plurality of stationary vanes arranged into an assembly at least upstream of the at least one row of rotor blades,
- wherein an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated,
- the method further comprising:
  - conducting an amount of input energy into the at least one rotary apparatus integrated into the steel production facility, the input energy comprising electrical energy,
  - supplying the stream of heated fluidic medium generated by the at least one rotary apparatus into at least one heat-consuming unit within the steel production facility, said heat-consuming unit configured to implement or mediate a heat-consuming process or processes related to manufacturing of steel, and
  - operating said at least one rotary apparatus and said at least one heat-consuming unit within the steel production facility to carry out steel production at temperatures equal to or exceeding 500 degrees Celsius (° C.).

2. The method of claim 1, wherein, in the steel production facility, the at least one heat-consuming unit is a furnace configured for steel making, and the at least one rotary apparatus is connected to said furnace.

3. The method of claim 2, wherein, the at least one heat-consuming unit is a furnace configured to react steel pre-cursor materials to produce steel.

4. The method of claim 2, wherein, the at least one heat-consuming unit is a furnace configured as a blast furnace for reducing iron ore to iron to produce molten iron.

5. The method of claim 2, wherein, the at least one heat-consuming unit is any one of: a furnace, a kiln or a reactor configured for direct reduction of iron ore to direct reduced iron (DRI).

6. The method of claim 1, wherein, in the steel production facility, the at least one heat-consuming unit is any one of: (i) a sintering/pellet plant configured to sinter iron ore into iron ore sinter/pellets, (ii) a coke plant configured to coke coal into coke, (iii) a post-processing unit configured for post-processing of a steel product via any one of: heat treatment, carburizing, casting and/or rolling, (iv) a reactor or a series of reactors configured for the endothermic reactions of off-gases generated in steel production, or (v) any combination thereof, and wherein the at least one rotary apparatus is connected to—and/or integrated into any one of units (i)-(v).

7. The method of claim 1, comprising generation, by the rotary apparatus, of the fluidic medium heated to the temperature equal to or exceeding 500 degrees Celsius (° C.).

8. The method of claim 1, comprising adjusting velocity and/or pressure of the stream of fluidic medium propagating through the rotary apparatus to produce conditions at which the stream of the heated fluidic medium is generated.

9. The method of claim 1, in which the heated fluidic medium is generated by at least one rotary apparatus comprising two or more rows of rotor blades sequentially arranged along the rotor shaft.

10. The method of claim 1, in which the heated fluidic medium is generated by at least one rotary apparatus further comprising a diffuser area arranged downstream of the at least one row of rotor blades, the method comprises operating the at least one rotary apparatus integrated into the steel production facility such, that an amount of thermal energy is imparted to a stream of fluidic medium directed along a flow path formed inside the casing between the inlet and the exit by virtue of a series of energy transformations occurring when said stream of fluidic medium successively passes through the stationary vanes, the rotor blades and the diffuser area, respectively, whereby a stream of heated fluidic medium is generated.

11. The method of claim 10, wherein, in said rotary apparatus, the diffuser area is configured with or without stationary diffuser vanes.

12. The method of claim 1, in which the amount of thermal energy added to the stream of fluidic medium propagating through the rotary apparatus is controlled by adjusting the amount of input energy conducted into the at least one rotary apparatus integrated into the steel production facility.

13. The method of claim 1, further comprising arranging an additional heating apparatus downstream of the at least one rotary apparatus and introducing a reactive compound or a mixture of reactive compounds to the stream of fluidic medium propagating through said additional heating apparatus, whereupon an amount of thermal energy is added to said stream of fluidic medium through exothermic reaction(s).

14. The method of claim 13, wherein the reactive compound or a mixture of reactive compounds is introduced to the stream of fluidic medium preheated to a predetermined temperature.

15. The method of claim 14, wherein the reactive compound or a mixture of reactive compounds is introduced to the stream of fluidic medium preheated to a temperature equal to or exceeding 1700° C.

16. The method of claim 14, wherein preheating of the stream of fluidic medium to the predetermined temperature is implemented in the rotary apparatus.

17. The method of claim 1, comprising generation of the heated fluidic medium by at least two rotary apparatuses integrated into the steel production facility, wherein the at least two rotary apparatuses are connected in parallel or in series.

18. The method of claim 17, comprising generation of the heated fluidic medium by at least two sequentially connected rotary apparatuses, wherein the stream of fluidic medium is preheated to a predetermined temperature in at least a first rotary apparatus in a sequence, and wherein said stream of fluidic medium is further heated in at least a second rotary apparatus in the sequence by inputting an additional amount of thermal energy into the stream of preheated fluidic medium propagating through said second rotary apparatus.

19. The method of claim 18, wherein, in at least the first rotary apparatus in the sequence, the stream of fluidic medium is preheated to a temperature equal to or exceeding 1700° C.

20. The method of claim 18, wherein the additional amount of thermal energy is added to the stream of fluidic medium propagating through said at least second rotary apparatus in the sequence by virtue of introducing a reactive compound or a mixture of reactive compounds into said stream.

21. The method of claim 1, comprising introducing the reactive compound or a mixture of reactive compounds into a process or processes related to the production of steel.

22. The method of claim 1, in which the heated fluidic medium generated by the at least one rotary apparatus is selected from the group consisting of a feed gas, a recycle gas, a make-up gas, and a process fluid.

23. The method of claim 1, wherein the fluidic medium that enters the rotary apparatus is a gaseous medium.

24. The method of claim 1, wherein the heated fluidic medium generated in the rotary apparatus comprises any one of: air, steam ($H_2O$), nitrogen ($N_2$), hydrogen ($H_2$), carbon dioxide ($CO_2$), carbon monoxide (CO), methane ($CH_4$), or any combination thereof.

25. The method of claim 1, further comprising generation of a heated fluidic medium and/or heated solid materials outside the rotary apparatus through a process of heat transfer between the heated fluidic medium generated in the rotary apparatus and any one of the above-mentioned substances bypassing the rotary apparatus.

26. The method of claim 1, wherein the heated fluidic medium generated by the at least one rotary apparatus is supplied into at least one heat-consuming unit within the steel production facility, the heat-consuming unit provided as any one of: (i) a furnace, a kiln or a reactor configured for making steel, (ii) a sintering/pellet plant configured to sinter iron ore into iron ore sinter/pellets, (iii) a coke plant configured to coke coal into coke, (iv) a post-processing unit configured for post-processing of a steel product via any one of: heat treatment, carburizing, casting and/or rolling, (v) a reactor or a series of reactors configured for the endothermic reactions of off-gases generated in steel production, or (vi) any combination thereof.

27. The method of claim 1, wherein the heated fluidic medium generated by the at least one rotary apparatus is further supplied into at least one heat-consuming unit within the steel production facility, the at least one heat-consuming unit being provided as any one of: a heater, a burner, an oven, an incinerator, a dryer, a conveyor device, or a combination thereof.

28. The method of claim 1, further comprising increasing pressure in the stream of fluidic medium propagating through the rotary apparatus.

29. The method of claim 1, in which the amount of electrical energy conducted as the input energy into the at least one rotary apparatus integrated in the steel production facility is within a range of 5 percent to 100 percent.

30. The method of claim 1, wherein the amount of electrical energy conducted as the input energy into the at least one rotary apparatus integrated in the steel production facility is obtainable from a source of renewable energy or a combination of different sources of energy.

31. The method of claim 1, wherein the at least one rotary apparatus is utilized to balance variations in the amount of electrical energy, by virtue of being integrated, into the steel production facility, together with an at least one non-electrical energy operable heater device.

32. The method of claim 1, wherein energy efficiency of the steel production facility is improved and/or wherein greenhouse gas and particle emissions in the steel production facility are reduced.

33. A method for inputting thermal energy into a process or processes related to producing steel in a steel production facility, the method comprises generation of a heated fluidic medium by at least one rotary apparatus integrated into the steel production facility, the at least one rotary apparatus comprising:

a casing with at least one inlet and at least one exit, a rotor comprising at least one row of rotor blades arranged over a circumference of a rotor hub mounted onto a rotor shaft, and a plurality of stationary vanes arranged into an assembly at least upstream of the at least one row of rotor blades, wherein an amount of thermal energy is imparted to a stream of fluidic medium directed along a flow path formed inside the casing between the inlet and the exit by virtue of a series of energy transformations occurring when said stream of fluidic medium passes through the stationary vanes and the at least one row of rotor blades, respectively, whereby a stream of heated fluidic medium is generated, the method further comprises:

conducting an amount of input energy into the at least one rotary apparatus integrated into the steel production facility, the input energy comprising electrical energy, supplying the stream of heated fluidic medium generated by the at least one rotary apparatus into at least one heat-consuming unit within the steel production facility, said heat-consuming unit configured to implement or mediate a heat-consuming process or processes related to manufacturing of steel, and operating the at least one rotary apparatus and said at least one heat-consuming unit within the steel production facility to carry out steel production at temperatures equal to or exceeding 500 degrees Celsius (° C.).

34. The method of claim 33, wherein the process related to producing steel in the steel production facility is any one of: (i) a process of making steel implemented in a furnace; (ii) a process of sintering iron ore into iron ore sinter/pellets implemented in a sintering/pellet plant, (iii) a process of coking coal into coke implemented in a coke plant, (iv) a process of post-processing of a steel product via any one of: heat treatment, carburizing, casting and/or rolling implemented in a post-processing unit, (v) endothermic reaction (s) carried out in a reactor or a series of reactors in steel production, or (vi) any combination thereof.

* * * * *